US012699691B1

(12) United States Patent (10) Patent No.: US 12,699,691 B1

Miller (45) Date of Patent: *Aug. 4, 2026

(54) PRESENTING FIELD VALUES BASED ON A SELECTED DELIMITER TYPE

(71) Applicant: Cisco Technology, Inc., San Jose, CA (US)

(72) Inventor: Jesse Brandau Miller, San Francisco, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/674,213

(22) Filed: May 24, 2024

Related U.S. Application Data

(63) Continuation of application No. 17/242,513, filed on Apr. 28, 2021, now Pat. No. 11,995,071, which is a continuation of application No. 16/256,775, filed on Jan. 24, 2019, now Pat. No. 11,042,539, which is a continuation of application No. 15/009,675, filed on Jan. 28, 2016, now Pat. No. 10,235,409.

(51) Int. Cl.
| | |
|---|---|
| *G06F 17/00* | (2019.01) |
| *G06F 16/242* | (2019.01) |
| *G06F 16/25* | (2019.01) |
| *G06F 16/9535* | (2019.01) |

(52) U.S. Cl.
CPC .......... *G06F 16/2428* (2019.01); *G06F 16/25* (2019.01); *G06F 16/9535* (2019.01)

(58) Field of Classification Search
CPC ... G06F 16/2428; G06F 16/25; G06F 16/9535
See application file for complete search history.

(56) References Cited

U.S. PATENT DOCUMENTS

| | | | |
|---|---|---|---|
| 5,530,794 A | 6/1996 | Luebbert | |
| 6,023,571 A | 2/2000 | Matsumoto et al. | |
| 8,682,925 B1 | 3/2014 | Marquardt et al. | |
| 9,922,037 B2 | 3/2018 | Miller | |
| 10,013,454 B2 | 7/2018 | Robichaud et al. | |
| 10,204,093 B2 | 2/2019 | Miller et al. | |
| 10,235,409 B2 * | 3/2019 | Miller | G06F 16/9535 |
| 11,386,133 B1 * | 7/2022 | Neels | G06F 16/248 |
| 11,995,071 B1 * | 5/2024 | Miller | G06F 16/9535 |
| 2009/0287628 A1 | 11/2009 | Indeck et al. | |
| 2009/0319512 A1 | 12/2009 | Baker et al. | |
| 2010/0142377 A1 | 6/2010 | Caciula et al. | |
| 2012/0079363 A1 | 3/2012 | Folting et al. | |

(Continued)

*Primary Examiner* — Greta L Robinson
(74) *Attorney, Agent, or Firm* — Shook, Hardy & Bacon L.L.P.

(57) ABSTRACT

In embodiments, method and systems are provided for facilitating identification of field values based on delimiters. In some implementations, a user selection of a delimiter type to use for identifying values within fields is received. The values within fields are generally separated from one another by delimiters. A first set of one or more values from a plurality of events based on the selected delimiter is identified. Further, a second set of one or more values from the plurality of events is identified based on the selected delimiter. The identified first set of one or more values to a first field and the second set of one or more values to a second field. Additional embodiments are described and/or claimed.

20 Claims, 31 Drawing Sheets

(56) References Cited

U.S. PATENT DOCUMENTS

| 2012/0117116 | A1 | 5/2012 | Jacobson et al. |
| 2012/0216114 | A1 | 8/2012 | Privault et al. |
| 2014/0236971 | A1 | 8/2014 | Carasso et al. |
| 2017/0039638 | A1 | 2/2017 | Lane |

* cited by examiner

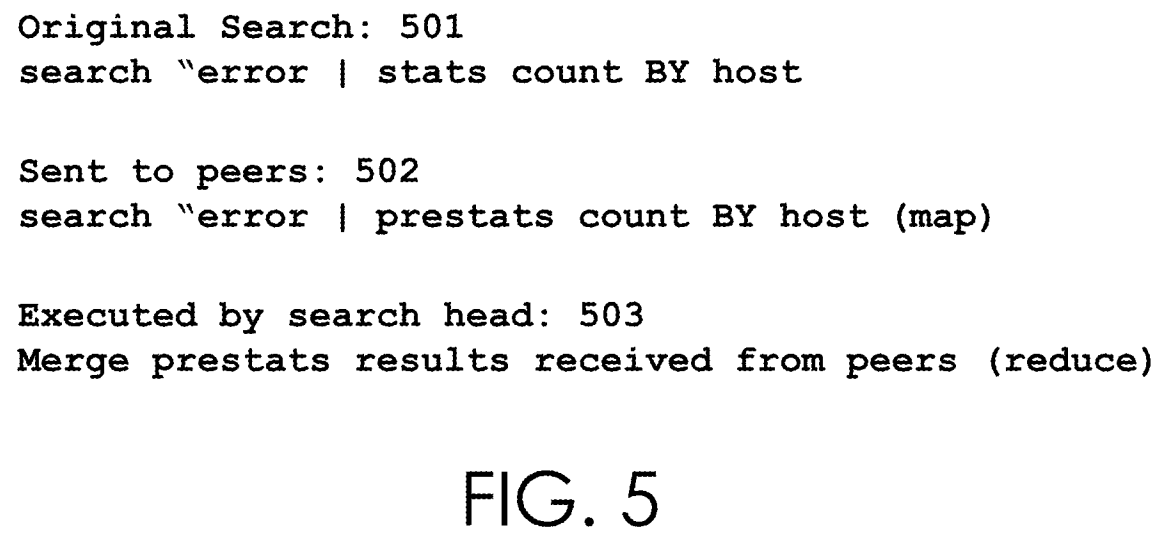

Original Search: 501
search "error | stats count BY host

Sent to peers: 502
search "error | prestats count BY host (map)

Executed by search head: 503
Merge prestats results received from peers (reduce)

FIG. 5

Data Summary　　　　　　　　　　　　　　　　　　　　×

| Hosts (5) | Sources (8) | Sourcetypes (3) |

( filter )

| Host ⬍ |  | Count ⬍ | Last Update ⬍ |
|--------|---|---------|---------------|
| mailsv | ⑊ ⌄ | 9,829 | 4/29/14 1:32:47.000 PM |
| vendor_sales | ⑊ ⌄ | 30,244 | 4/29/14 1:32:46.000 PM |
| www1 | ⑊ ⌄ | 24,221 | 4/29/14 1:32:44.000 PM |
| www2 | ⑊ ⌄ | 22,595 | 4/29/14 1:32:47.000 PM |
| www3 | ⑊ ⌄ | 22,975 | 4/29/14 1:32:45.000 PM |

Figure 14:
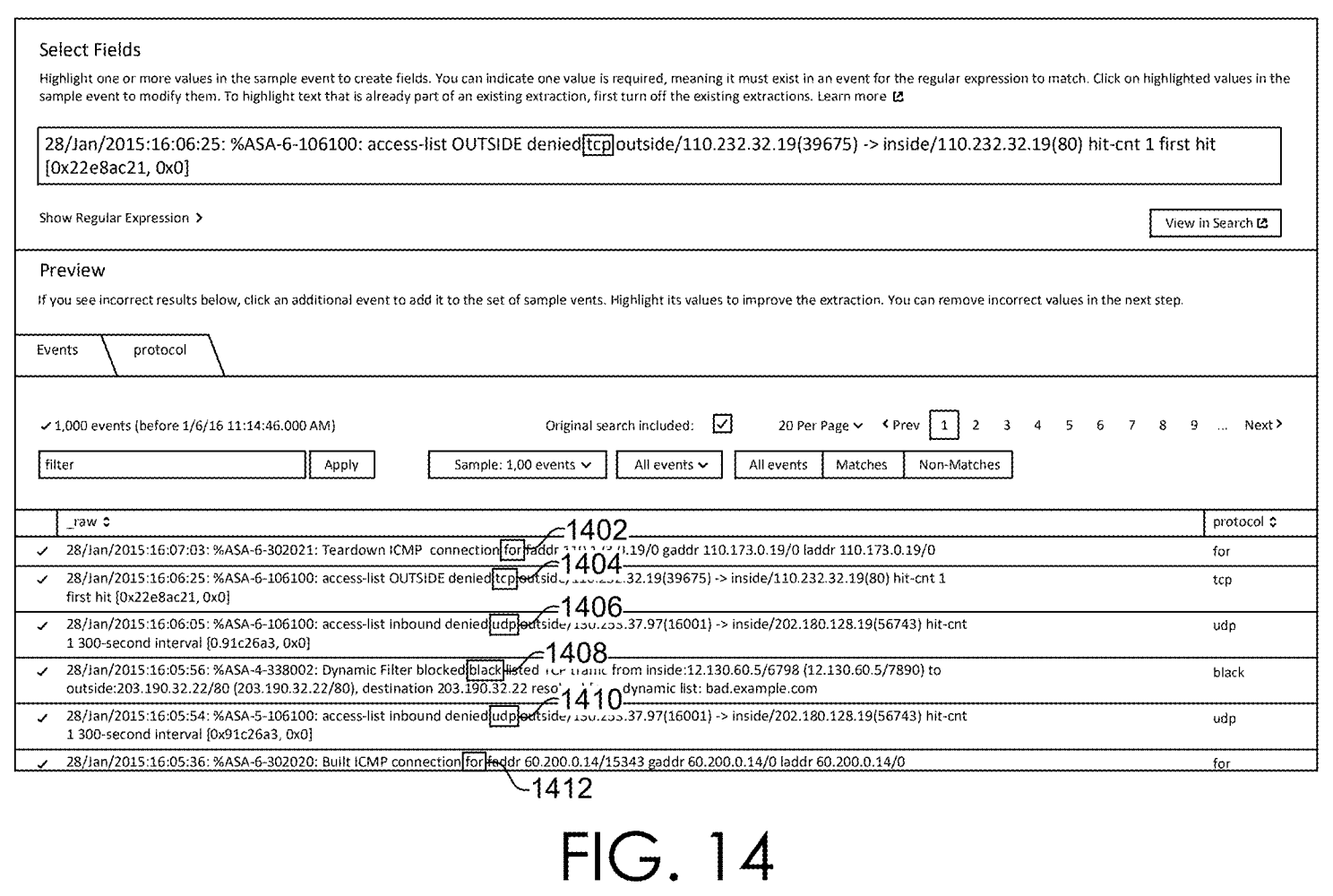

Select Fields

Highlight one or more values in the sample event to create fields. You can indicate one value is required, meaning it must exist in an event for the regular expression to match. Click on highlighted values in the sample event to modify them. To highlight text that is already part of an existing extraction, first turn off the existing extractions. Learn more ⌂

28/Jan/2015:16:06:25: %ASA-6-106100: access-list OUTSIDE denied[tcp]outside/110.232.32.19(39675) -> inside/110.232.32.19(80) hit-cnt 1 first hit [0x22e8ac21, 0x0]

Show Regular Expression ›                                                                                         View in Search ⌂

Preview

If you see incorrect results below, click an additional event to add it to the set of sample vents. Highlight its values to improve the extraction. You can remove incorrect values in the next step.

| Events | protocol |
| --- | --- |

✓1,000 events (before 1/6/16 11:14:46.000 AM)      Original search included: ☑    20 Per Page ∨   ‹ Prev  [1]  2  3  4  5  6  7  8  9  …  Next ›

| filter | | Apply | | Sample: 1,00 events ∨ | All events ∨ | All events | Matches | Non-Matches |
| --- | --- | --- | --- | --- | --- | --- | --- | --- |

| _raw ⇕ | protocol ⇕ |
| --- | --- |
| ✓ 28/Jan/2015:16:07:03: %ASA-6-302021: Teardown ICMP connection[for]addr ¬¬¬¬,19/0 gaddr 110.173.0.19/0 laddr 110.173.0.19/0 ⟵1404 | for |
| ✓ 28/Jan/2015:16:06:25: %ASA-6-106100: access-list OUTSIDE denied[tcp]outsid¬¬32.19(39675) -> inside/110.232.32.19(80) hit-cnt 1 first hit [0x22e8ac21, 0x0] ⟵1406 | tcp |
| ✓ 28/Jan/2015:16:06:05: %ASA-6-106100: access-list inbound denied[udp]outside¬¬¬¬.37.97(16001) -> inside/202.180.128.19(56743) hit-cnt 1 300-second interval [0.91c26a3, 0x0] ⟵1408 | udp |
| ✓ 28/Jan/2015:16:05:56: %ASA-4-338002: Dynamic Filter blocked[black]listed ¬¬ ¬¬¬¬ from inside:12.130.60.5/6798 (12.130.60.5/7890) to outside:203.190.32.22/80 (203.190.32.22/80), destination 203.190.32.22 reso¬¬ dynamic list: bad.example.com ⟵1410 | black |
| ✓ 28/Jan/2015:16:05:54: %ASA-5-106100: access-list inbound denied[udp]outsid¬¬¬¬.37.97(16001) -> inside/202.180.128.19(56743) hit-cnt 1 300-second interval [0x91c26a3, 0x0] | udp |
| ✓ 28/Jan/2015:16:05:36: %ASA-6-302020: Built ICMP connection[for]addr 60.200.0.14/15343 gaddr 60.200.0.14/0 laddr 60.200.0.14/0 ⟵1412 | for |

Figure 22:
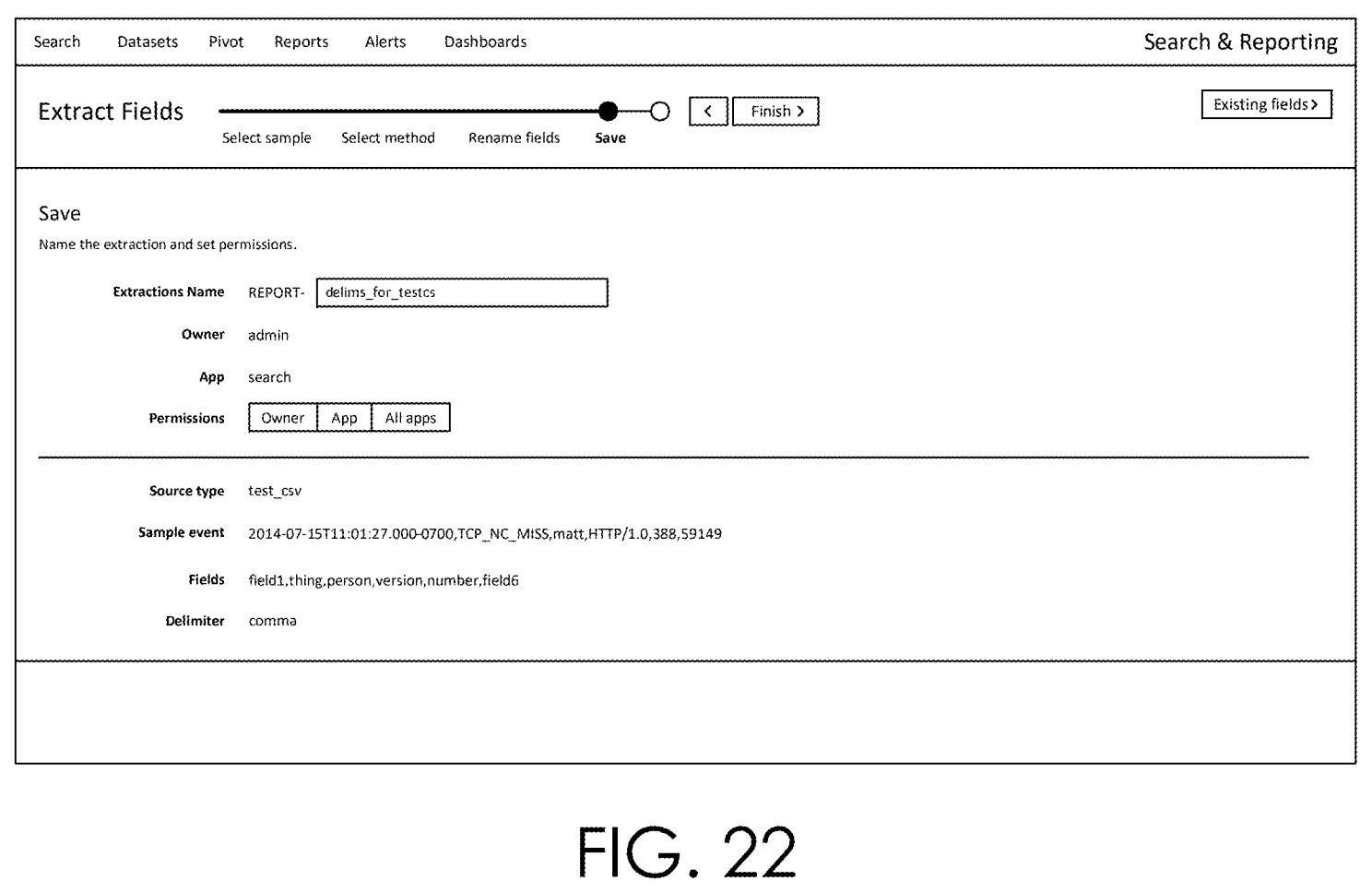

Search    Datasets    Pivot    Reports    Alerts    Dashboards                    Search & Reporting

Extract Fields

Select sample    Select method    Rename fields    Save

● ――― ○    [ ˅ ]    [ Finish › ]                              [ Existing fields › ]

Save

Name the extraction and set permissions.

Extractions Name    REPORT-    [ delims_for_testcs ]

Owner    admin

App    search

Permissions    [ Owner | App | All apps ]

Source type    test_csv

Sample event    2014-07-15T11:01:27.000-0700,TCP_NC_MISS,matt,HTTP/1.0,388,59149

Fields    field1,thing,person,version,number,field6

Delimiter    comma

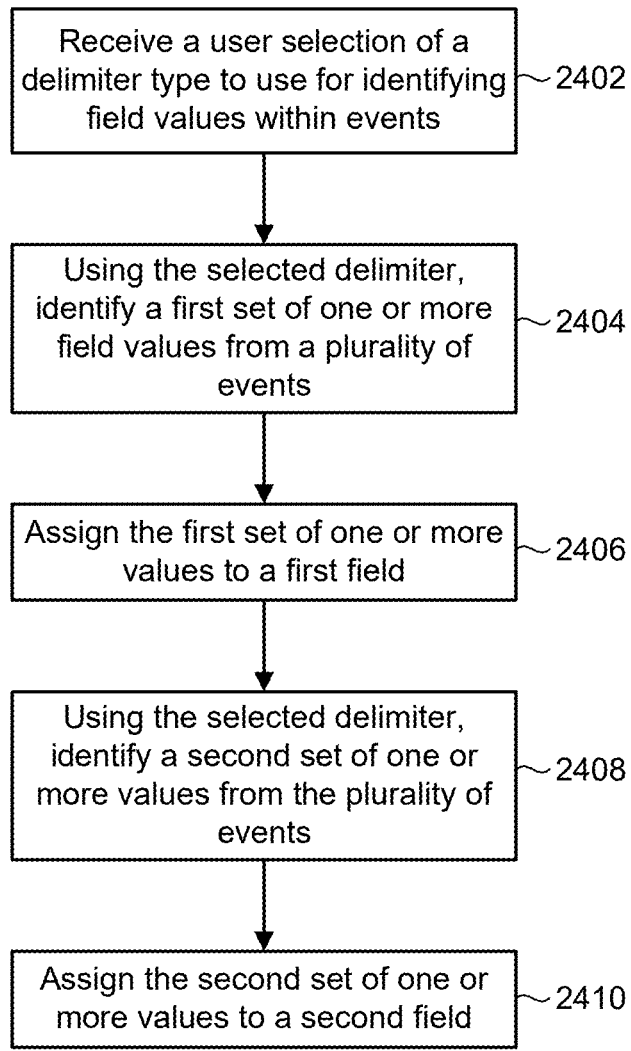

Receive a user selection of a delimiter type to use for identifying field values within events ~2402

Using the selected delimiter, identify a first set of one or more field values from a plurality of events ~2404

Assign the first set of one or more values to a first field ~2406

Using the selected delimiter, identify a second set of one or more values from the plurality of events ~2408

Assign the second set of one or more values to a second field ~2410

FIG. 24

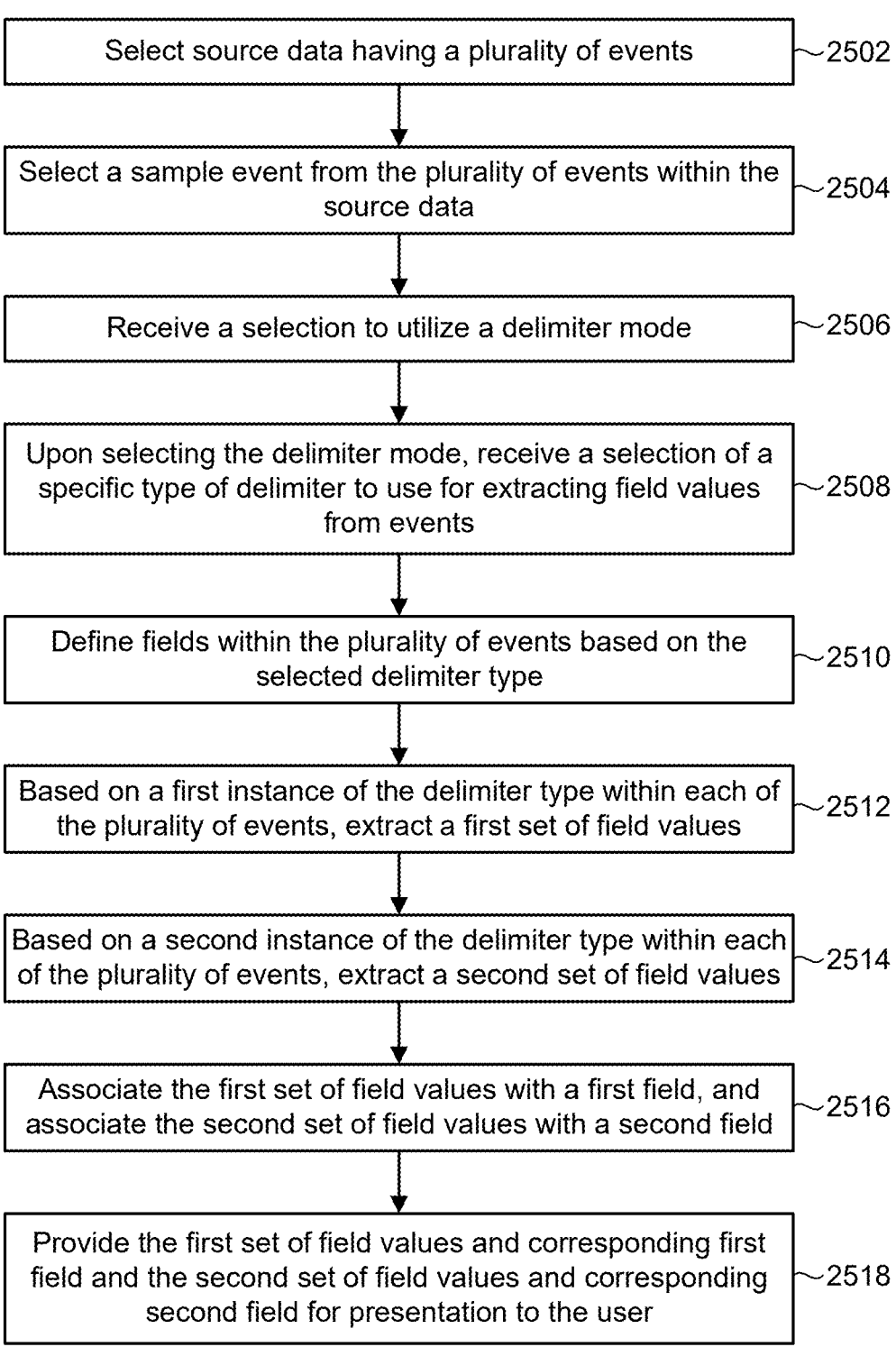

Select source data having a plurality of events ~2502

Select a sample event from the plurality of events within the source data ~2504

Receive a selection to utilize a delimiter mode ~2506

Upon selecting the delimiter mode, receive a selection of a specific type of delimiter to use for extracting field values from events ~2508

Define fields within the plurality of events based on the selected delimiter type ~2510

Based on a first instance of the delimiter type within each of the plurality of events, extract a first set of field values ~2512

Based on a second instance of the delimiter type within each of the plurality of events, extract a second set of field values ~2514

Associate the first set of field values with a first field, and associate the second set of field values with a second field ~2516

Provide the first set of field values and corresponding first field and the second set of field values and corresponding second field for presentation to the user ~2518

FIG. 25

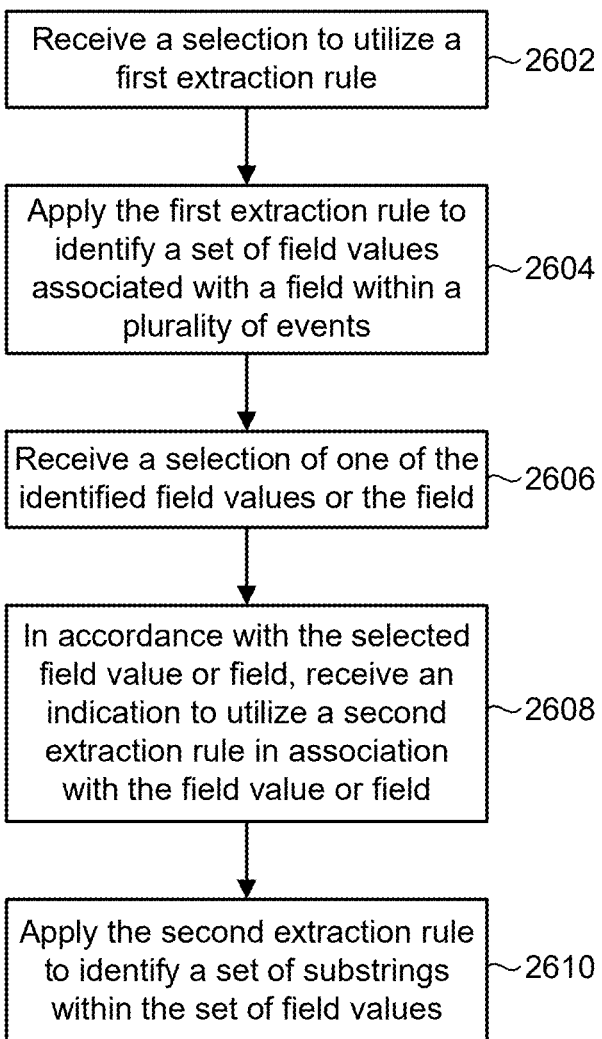

Receive a selection to utilize a first extraction rule ~2602

Apply the first extraction rule to identify a set of field values associated with a field within a plurality of events ~2604

Receive a selection of one of the identified field values or the field ~2606

In accordance with the selected field value or field, receive an indication to utilize a second extraction rule in association with the field value or field ~2608

Apply the second extraction rule to identify a set of substrings within the set of field values ~2610

FIG. 26

PRESENTING FIELD VALUES BASED ON A SELECTED DELIMITER TYPE

CROSS-REFERENCE TO RELATED APPLICATIONS

This application is a continuation of U.S. application Ser. No. 17/242,513, filed Apr. 28, 2021, now U.S. Pat. No. 11,995,071, which is a continuation of U.S. application Ser. No. 16/256,775, filed Jan. 24, 2019, now U.S. Pat. No. 11,042,539, which is a continuation of U.S. application Ser. No. 15/009,675, filed Jan. 28, 2016, now U.S. Pat. No. 10,235,409, the entire contents of each are incorporated by reference herein.

BACKGROUND

Modern data centers often include thousands of hosts that operate collectively to service requests from even larger numbers of remote clients. During operation, components of these data centers can product significant volumes of machine-generated data. In order to reduce the size of the data, it is typically pre-processed before it is stored. In some instances, the pre-processing includes extracting and storing some of the data, but discarding the remainder of the data. Although this may save storage space in the short term, it can be undesirable in the longer term. For example, if the discarded data is later determined to be of use, it may no longer be available.

SUMMARY

Embodiments of the present invention are directed to facilitating identification of field values based on delimiters. In accordance with aspects of the present disclosure, a user selection of a delimiter type to use for identifying values within fields is received. The values within fields are generally separated from one another by delimiters. A first set of one or more values from a plurality of events based on the selected delimiter is identified. Further, a second set of one or more values from the plurality of events is identified based on the selected delimiter. The identified first set of one or more values to a first field and the second set of one or more values to a second field. Additional embodiments are described and/or claimed.

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

BRIEF DESCRIPTION OF THE DRAWINGS

FIG. 5 illustrates an exemplary search query received from a client and executed by search peers in accordance with the disclosed embodiments.

FIG. 6B illustrates a data summary dialog that enables a user to select various data sources in accordance with the disclosed embodiments.

FIG. 10 illustrates a user interface presenting a plurality of events, in accordance with embodiments of the present disclosure.

FIG. 14 illustrates a user interface for extracting values, in accordance with embodiments of the present disclosure.

Figure 15:
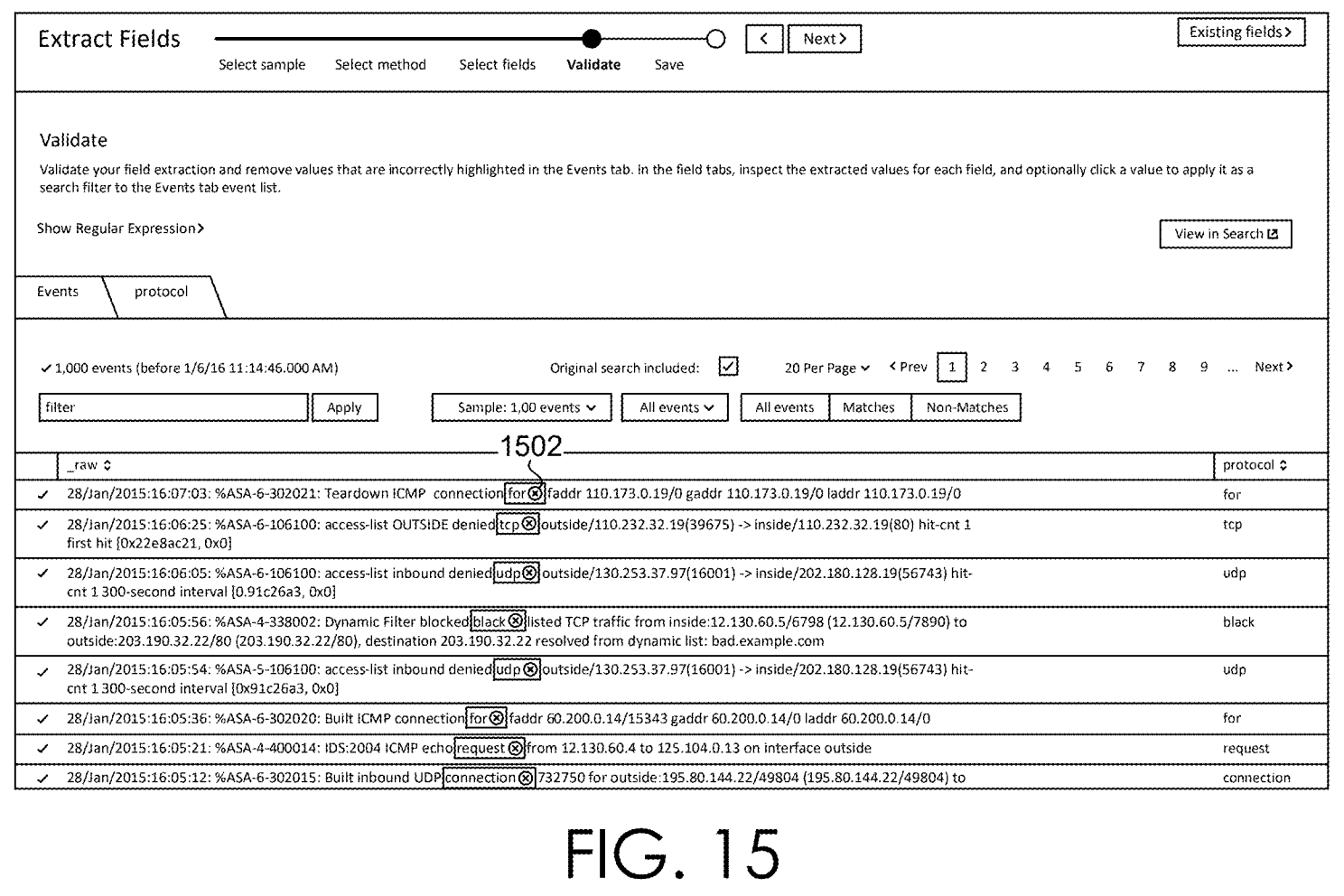

FIG. 15 illustrates a user interface for modifying data extractions, in accordance with embodiments of the present disclosure.

FIG. 22 illustrates a user interface for saving field extractions, in accordance with embodiments of the present disclosure.

FIG. 23 illustrates a search user interface, in accordance with embodiments of the present disclosure.

FIG. 24 is a flow diagram depicting an illustrative method of processing field extractions in accordance with a delimiter mode, in accordance with embodiments of the present disclosure.

FIG. 25 is a flow diagram depicting another illustrative method of processing field extractions in accordance with a delimiter mode, in accordance with embodiments of the present disclosure.

FIG. 26 is a flow diagram depicting an illustrative method of processing nested field extractions in accordance with embodiments described herein.

DETAILED DESCRIPTION

Figure 1:
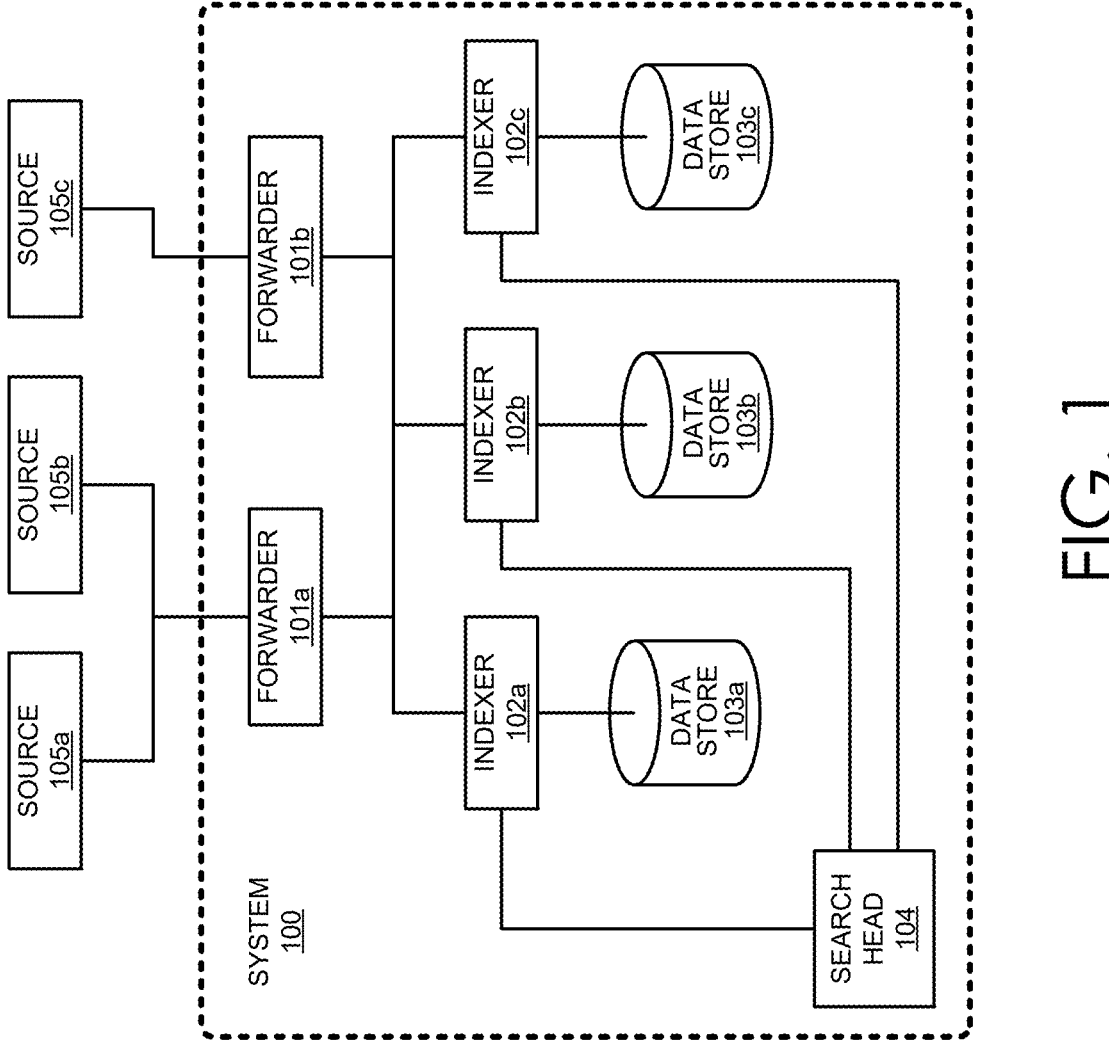
FIG. 1 presents a block diagram of an event-processing system in accordance with the disclosed embodiments.

In the following detailed description, reference is made to the accompanying drawings which form a part hereof wherein like numerals designate like parts throughout, and in which is shown, by way of illustration, embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Various aspects of the illustrative embodiments will be described using terms commonly employed by those skilled in the art to convey the substance of their work to others skilled in the art. However, it will be apparent to those skilled in the art that alternate embodiments may be practiced with only some of the described aspects. For purposes of explanation, specific numbers, materials, and configurations are set forth in order to provide a thorough understanding of the illustrative embodiments. However, it will be apparent to one skilled in the art that alternate embodiments may be practiced without these specific details. In other instances, well-known features are omitted or simplified in order not to obscure the illustrative embodiments.

Various operations will be described as multiple discrete operations, in turn, in a manner that is most helpful in understanding the illustrative embodiments; however, the order of description should not be construed as to imply that these operations are necessarily order dependent. In particular, these operations need not be performed in the order of presentation. Further, descriptions of operations as separate operations should not be construed as requiring that the operations be necessarily performed independently and/or by separate entities. Descriptions of entities and/or modules as separate modules should likewise not be construed as requiring that the modules be separate and/or perform separate operations. In various embodiments, illustrated and/or described operations, entities, data, and/or modules may be merged, broken into further sub-parts, and/or omitted.

The phrase "in one embodiment" or "in an embodiment" is used repeatedly. The phrase may refer to the same embodiment or another embodiment. The terms "comprising," "having," and "including" are synonymous, unless the context dictates otherwise. The phrase "A/B" means "A or B." The phrase "A and/or B" means "(A), (B), or (A and B)." The phrase "at least one of A, B and C" means "(A), (B), (C), (A and B), (A and C), (B and C), or (A, B and C)."

1.1 Overview

Modern data centers often comprise thousands of host computer systems that operate collectively to service requests for data from an even larger numbers of remote clients. During operation, these data centers generate significant volumes of performance data and diagnostic information that can be analyzed to quickly diagnose performance problems. In order to reduce the size of this performance data, the data is typically pre-processed prior to being stored based on anticipated data-analysis needs. For example, pre-specified data items can be extracted from the performance data and stored in a database to facilitate efficient retrieval and analysis at search time. However, the rest of the performance data is not saved and is essentially discarded during pre-processing. As storage capacity becomes progressively cheaper and more plentiful, there are fewer incentives to discard this performance data and many reasons to keep it. It will be appreciated that, while performance data is specifically mentioned above, this disclosure is not limited to such embodiments and can be applied to any type of data.

This plentiful storage capacity is presently making it feasible to store massive quantities of minimally processed performance data at "ingestion time" for later retrieval and analysis at "search time." Note that performing the analysis operations at search time provides greater flexibility because it enables an analyst to search all of the performance data, instead of searching pre-specified data items that were stored at ingestion time. This enables the analyst to investigate different aspects of the performance data instead of being confined to the pre-specified set of data items that were selected at ingestion time.

However, analyzing massive quantities of heterogeneous performance data at search time can be a challenging task. A data center may generate heterogeneous performance data from thousands of different components, which can collectively generate tremendous volumes of performance data that can be time-consuming to analyze. For example, this performance data can include data from system logs, network packet data, sensor data, and data generated by various applications. Also, the unstructured nature of much of this performance data, despite the above discussed benefits, can pose additional challenges because of the difficulty of applying semantic meaning to unstructured data, and the difficulty of indexing and querying, or searching, unstructured data using traditional database systems.

These challenges can be addressed by using an event-based search support system, such as the SPLUNK® ENTERPRISE system produced by Splunk Inc. of San Francisco, California, to store and process performance data. The SPLUNK® ENTERPRISE system is the leading platform for providing real-time operational intelligence that enables organizations to collect, index, and harness machine-generated data from various websites, applications, servers, networks, and mobile devices that power their businesses. The SPLUNK® ENTERPRISE system can be particularly useful for analyzing unstructured performance data, which is commonly found in system log files, for example. Although many of the techniques described herein are explained with reference to the SPLUNK® ENTERPRISE system, the techniques are also applicable to other types of search support systems such as, for example, Hadoop, Cassandra, and MongoDB.

In the SPLUNK® ENTERPRISE system, performance data is stored in data stores as "events," wherein each event comprises a collection of performance data and/or diagnostic information that is generated by a computer system and is correlated with a specific point in time. In embodiments, this collection of performance data and/or diagnostic data can be raw data. Events can be derived from "time series data," wherein time series data comprises a sequence of data points (e.g., performance measurements from a computer system) that are associated with successive points in time and are typically spaced at uniform time intervals. Events can also be derived from "structured" or "unstructured" data. Structured data has a predefined format, wherein specific data items with specific data formats reside at predefined locations in the data. For example, structured data can include data items stored in fields in a database table. In contrast, unstructured data does not have a predefined format. This means that unstructured data can comprise various data items having different data types that can reside at different locations. For example, when the data source is an operating system log, an event can include one or more lines from the operating system log containing raw data that includes different types of performance and diagnostic information associated with a specific point in time. Examples of data sources from which an event may be derived include, but are not limited to: web servers; application servers; databases; firewalls; routers; operating systems; and software applications that execute on computer systems, mobile devices, and sensors. The data generated by such data sources can be produced in various forms including, for example and without limitation, server log files, activity log files, configuration files, messages, network packet data, performance measurements, and sensor measurements. An event typically includes a timestamp that may be derived from the raw data in the event, or may be determined through interpolation between temporally proximate events having known timestamps.

The SPLUNK® ENTERPRISE system also facilitates using a flexible schema to specify how to extract information from the event data, wherein the flexible schema may be developed and redefined as needed. Note that a flexible schema may be applied to event data "on the fly," when it is needed (e.g., at search time), rather than at ingestion time of the data as in traditional database systems. Because the schema is not applied to event data until it is needed (e.g., at search time), it is referred to as a "late-binding schema."

During operation, the SPLUNK® ENTERPRISE system starts with raw data, which can include unstructured data, machine data, performance measurements, or other time-series data, such as, for example, data obtained from weblogs, syslogs, or sensor readings. It divides this raw data into "portions," and optionally transforms the data to produce timestamped events. The system stores the time-stamped events in a data store, such as those discussed in detail below, and enables a user to run queries, or search requests, against the data store to retrieve events that meet specified criteria, such as containing certain keywords or having specific values in defined fields. Note that the term "field" refers to a location in the event data containing a value for a specific data item.

As noted above, the SPLUNK® ENTERPRISE system facilitates using a late-binding schema while performing queries on events. A late-binding schema specifies "extraction rules" that are applied to data of the events to extract values for specific fields of the events. More specifically, the extraction rules for a field can include one or more instructions that specify how to extract a value for the field from the event data. An extraction rule can generally include any type of instruction for extracting values from data in events. In some cases, an extraction rule comprises a regular expression, in which case the rule is referred to as a "regex rule."

In contrast to a conventional schema for a database system, a late-binding schema is not defined at data ingestion time. Instead, the late-binding schema can be developed on an ongoing basis until the time a query, or search request, is actually executed. This means that extraction rules for the fields in a search request may be provided in the search request itself, or may be located during execution of the search request. Hence, as an analyst learns more about the data in the events, the analyst can continue to refine the late-binding schema by adding new fields, deleting fields, or changing the field extraction rules until the next time the schema is used by a search request. Because the SPLUNK® ENTERPRISE system maintains the underlying raw data and provides a late-binding schema for searching the raw data, it enables an analyst to investigate questions that arise as the analyst learns more about the events.

In the SPLUNK® ENTERPRISE system, a field extractor may be configured to automatically generate extraction rules for certain fields in the events when the events are being created, indexed, or stored, or possibly at a later time. Alternatively, a user may manually define extraction rules for fields using a variety of techniques.

Also, a number of "default fields" that specify metadata about the events rather than data in the events themselves can be created automatically. For example, such default fields can specify: a timestamp for the event data; a host from which the event data originated; a source of the event data; and a source type for the event data. These default fields may be determined automatically when the events are created, indexed, or stored.

In some embodiments, a common field name may be used to reference two or more fields containing equivalent data items, even though the fields may be associated with different types of events that possibly have different data formats and different extraction rules. By enabling a common field name to be used to identify equivalent fields from different types of events generated by different data sources, the system facilitates use of a "common information model" (CIM) across the different data sources.

1.2 Data Server System

FIG. 1 presents a block diagram of an exemplary event-processing system 100, similar to the SPLUNK® ENTERPRISE system. System 100 includes one or more forwarders 101*a-b* that collect data obtained from a variety of different data sources 105*a-c*, and one or more indexers 102*a-c* that store, process, and/or perform operations on this data, wherein each indexer operates on data contained in a specific data store 103*a-c*. These forwarders and indexers can comprise separate computer systems in a data center, or may alternatively comprise separate processes executing on various computer systems in a data center.

During operation, the forwarders 101*a-b* identify which indexers 102*a-c* will receive the collected data and then forward the data to the identified indexers. Forwarders 101*a-b* can also perform operations to strip out extraneous data and detect timestamps in the data. The forwarders next determine which indexers 102*a-c* will receive each data item and then forward the data items to the determined indexers 102*a-c*.

Note that distributing data across different indexers facilitates parallel processing. This parallel processing can take place at data ingestion time, because multiple indexers can process the incoming data in parallel. The parallel processing can also take place at search time, because multiple indexers can search through the data in parallel.

System 100 and the processes described below with respect to FIGS. 1-5 are further described in "Exploring Splunk Search Processing Language (SPL) Primer and Cookbook" by David Carasso, CITO Research, 2012, and in "Optimizing Data Analysis With a Semi-Structured Time Series Database" by Ledion Bitincka, Archana Ganapathi, Stephen Sorkin, and Steve Zhang, SLAML, 2010, each of which is hereby incorporated herein by reference in its entirety for all purposes.

1.3 Data Ingestion

Figure 2:
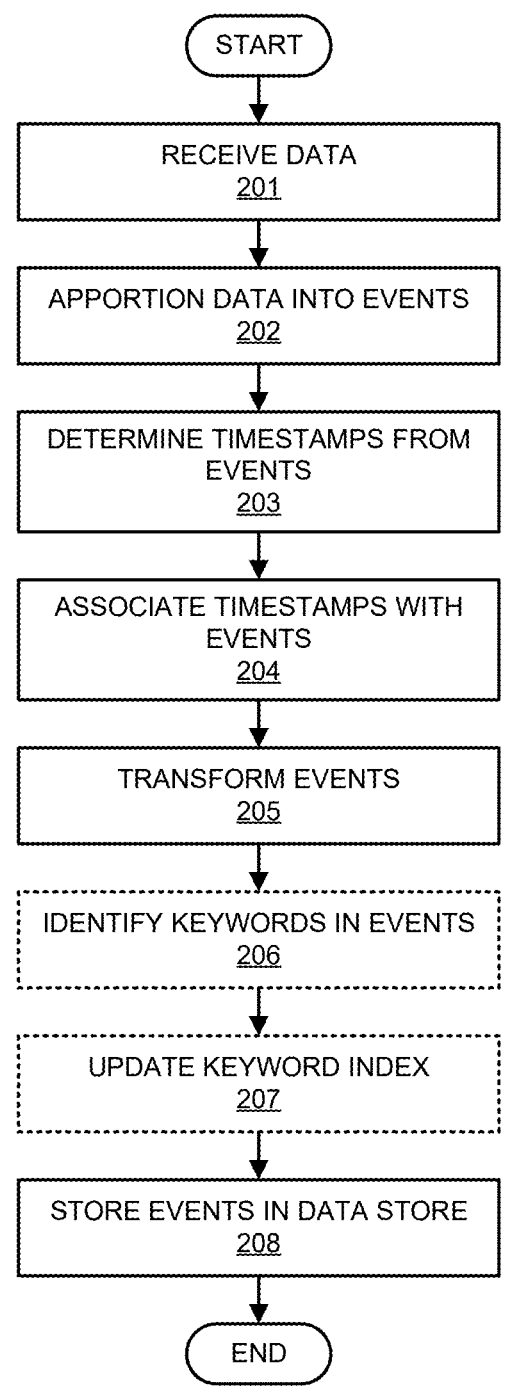
FIG. 2 presents a flowchart illustrating how indexers process, index, and store data received from forwarders in accordance with the disclosed embodiments.

FIG. 2 presents a flowchart illustrating how an indexer processes, indexes, and stores data received from forwarders in accordance with the disclosed embodiments. At block 201, the indexer receives the data from the forwarder. Next, at block 202, the indexer apportions the data into events. Note that the data can include lines of text that are separated by carriage returns or line breaks and an event may include one or more of these lines. During the apportioning process, the indexer can use heuristic rules to automatically determine the boundaries of the events, which for example coincide with line boundaries. These heuristic rules may be determined based on the source of the data, wherein the indexer can be explicitly informed about the source of the data or can infer the source of the data by examining the data. These heuristic rules can include regular expression-based rules or delimiter-based rules for determining event boundaries, wherein the event boundaries may be indicated by predefined characters or character strings. These predefined characters may include punctuation marks or other special characters including, for example, carriage returns, tabs, spaces or line breaks. In some cases, a user can fine-tune or configure the rules that the indexers use to determine event boundaries in order to adapt the rules to the user's specific requirements.

Next, the indexer determines a timestamp for each event at block 203. As mentioned above, these timestamps can be determined by extracting the time directly from data in the event, or by interpolating the time based on timestamps from temporally proximate events. In some cases, a timestamp can be determined based on the time the data was received or generated. The indexer subsequently associates the determined timestamp with each event at block 204, for example by storing the timestamp as metadata for each event.

Then, the system can apply transformations to data to be included in events at block 205. For log data, such transformations can include removing a portion of an event (e.g., a portion used to define event boundaries, extraneous text, characters, etc.) or removing redundant portions of an event. Note that a user can specify portions to be removed using a regular expression or any other possible technique.

Next, a keyword index can optionally be generated to facilitate fast keyword searching for events. To build a keyword index, the indexer first identifies a set of keywords in block 206. Then, at block 207 the indexer includes the identified keywords in an index, which associates each stored keyword with references to events containing that keyword (or to locations within events where that keyword is located). When an indexer subsequently receives a keyword-based query, the indexer can access the keyword index to quickly identify events containing the keyword.

In some embodiments, the keyword index may include entries for name-value pairs found in events, wherein a name-value pair can include a pair of keywords connected by a symbol, such as an equals sign or colon. In this way, events containing these name-value pairs can be quickly located. In some embodiments, fields can automatically be generated for some or all of the name-value pairs at the time of indexing. For example, if the string "dest=10.0.1.2" is found in an event, a field named "dest" may be created for the event, and assigned a value of "10.0.1.2."

Finally, the indexer stores the events in a data store at block 208, wherein a timestamp can be stored with each event to facilitate searching for events based on a time range. In some cases, the stored events are organized into a plurality of buckets, wherein each bucket stores events associated with a specific time range. This not only improves time-based searches, but it also allows events with recent timestamps that may have a higher likelihood of being accessed to be stored in faster memory to facilitate faster retrieval. For example, a bucket containing the most recent events can be stored as flash memory instead of on hard disk.

Each indexer 102*a-c* is responsible for storing and searching a subset of the events contained in a corresponding data store 103*a-c*. By distributing events among the indexers and data stores, the indexers can analyze events for a query in parallel, for example using map-reduce techniques, wherein each indexer returns partial responses for a subset of events to a search head that combines the results to produce an answer for the query. By storing events in buckets for specific time ranges, an indexer may further optimize searching by looking only in buckets for time ranges that are relevant to a query.

Moreover, events and buckets can also be replicated across different indexers and data stores to facilitate high availability and disaster recovery as is described in U.S. patent application Ser. No. 14/266,812 filed on 30 Apr. 2014, and in U.S. patent application Ser. No. 14/266,817 also filed on 30 Apr. 2014.

1.4 Query Processing

Figure 3:
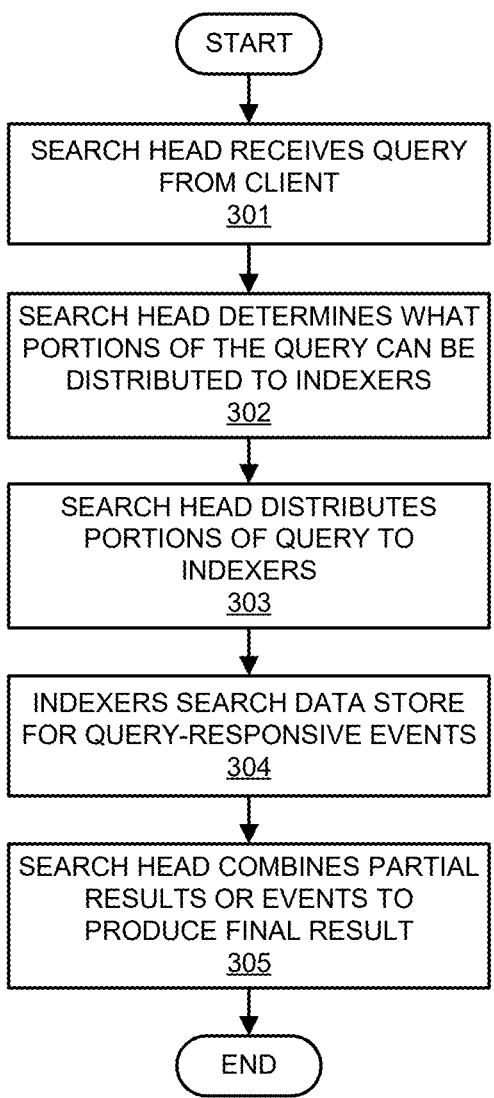
FIG. 3 presents a flowchart illustrating how a search head and indexers perform a search query in accordance with the disclosed embodiments.

FIG. 3 presents a flowchart illustrating how a search head and indexers perform a search query in accordance with the disclosed embodiments. At the start of this process, a search head receives a search query from a client at block 301. Next, at block 302, the search head analyzes the search query to determine what portions can be delegated to indexers and what portions need to be executed locally by the search head. At block 303, the search head distributes the determined portions of the query to the indexers. Note that commands that operate on single events can be trivially delegated to the indexers, while commands that involve events from multiple indexers are harder to delegate.

Then, at block 304, the indexers to which the query was distributed search their data stores for events that are responsive to the query. To determine which events are responsive to the query, the indexer searches for events that match the criteria specified in the query. This criteria can include matching keywords or specific values for certain fields. In a query that uses a late-binding schema, the searching operations in block 304 may involve using the late-binding scheme to extract values for specified fields from events at the time the query is processed. Next, the indexers can either send the relevant events back to the search head, or use the events to calculate a partial result, and send the partial result back to the search head.

Finally, at block 305, the search head combines the partial results and/or events received from the indexers to produce a final result for the query. This final result can comprise different types of data depending upon what the query is asking for. For example, the final results can include a listing of matching events returned by the query, or some type of visualization of data from the returned events. In another example, the final result can include one or more calculated values derived from the matching events.

Moreover, the results generated by system 100 can be returned to a client using different techniques. For example, one technique streams results back to a client in real-time as they are identified. Another technique waits to report results to the client until a complete set of results is ready to return to the client. Yet another technique streams interim results back to the client in real-time until a complete set of results is ready, and then returns the complete set of results to the client. In another technique, certain results are stored as "search jobs," and the client may subsequently retrieve the results by referencing the search jobs.

The search head can also perform various operations to make the search more efficient. For example, before the search head starts executing a query, the search head can determine a time range for the query and a set of common keywords that all matching events must include. Next, the search head can use these parameters to query the indexers to obtain a superset of the eventual results. Then, during a filtering stage, the search head can perform field-extraction operations on the superset to produce a reduced set of search results.

1.5 Field Extraction

Figure 4:
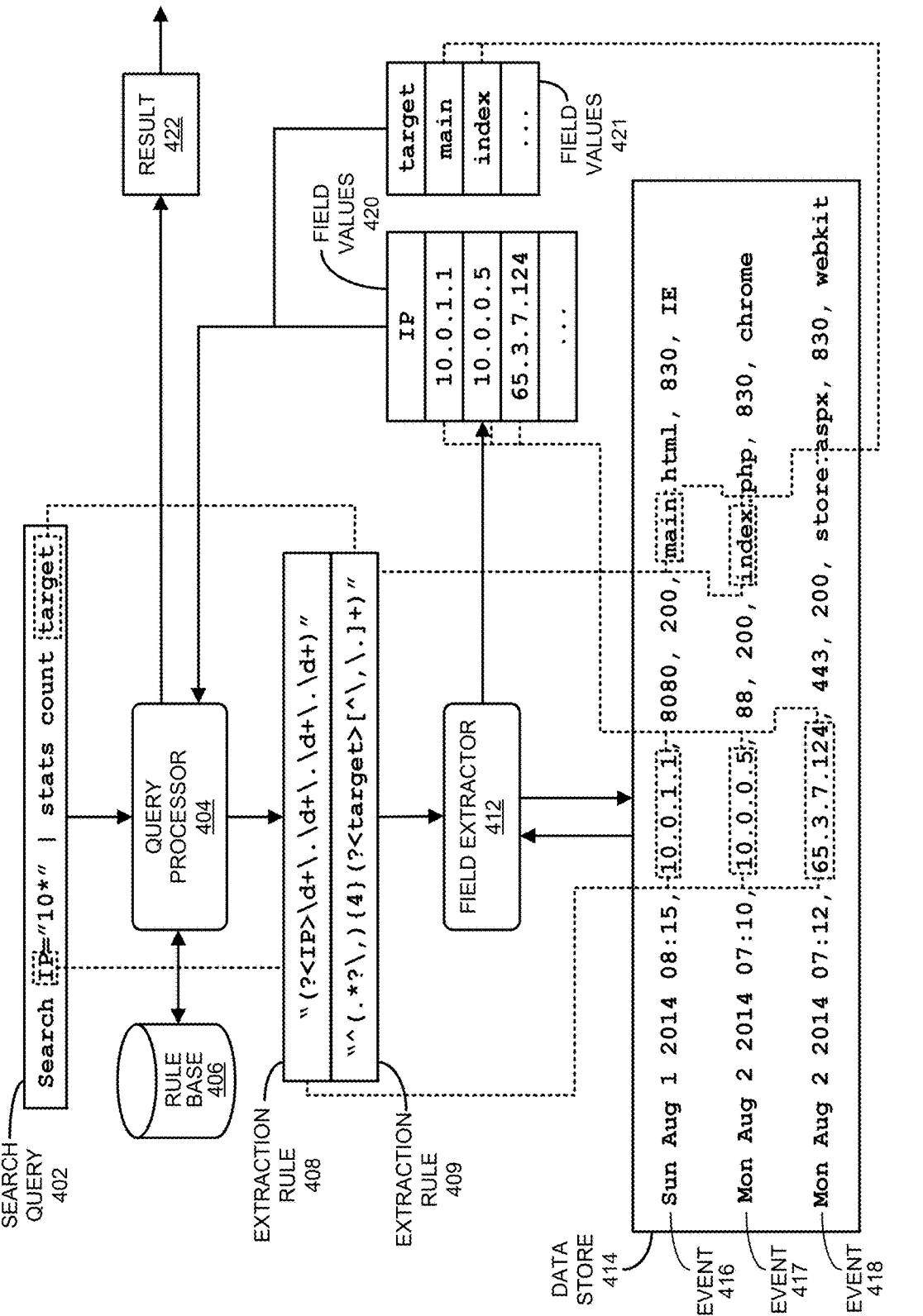
FIG. 4 presents a block diagram of a system for processing search requests that uses extraction rules for field values in accordance with the disclosed embodiments.

FIG. 4 presents a block diagram illustrating how fields can be extracted during query processing in accordance with the disclosed embodiments. At the start of this process, a search query 402 is received at a query processor 404. Query processor 404 includes various mechanisms for processing a query, wherein these mechanisms can reside in a search head 104 and/or an indexer 102*a-c*. Note that the exemplary search query 402 illustrated in FIG. 4 is expressed in Search Processing Language (SPL), which is used in conjunction with the SPLUNK® ENTERPRISE system. SPL is a pipelined search language in which a set of inputs is operated on by a first command in a command line, and then a subsequent command following the pipe symbol "|" operates on the results produced by the first command, and so on for additional commands. Search query 402 can also be expressed in other query languages, such as the Structured Query Language ("SQL") or any suitable query language.

Upon receiving search query 402, query processor 404 sees that search query 402 includes two fields "IP" and "target." Query processor 404 also determines that the values for the "IP" and "target" fields have not already been extracted from events in data store 414, and consequently determines that query processor 404 needs to use extraction rules to extract values for the fields. Hence, query processor 404 performs a lookup for the extraction rules in a rule base 406, wherein rule base 406 maps field names to corresponding extraction rules and obtains extraction rules 408-409, wherein extraction rule 408 specifies how to extract a value for the "IP" field from an event, and extraction rule 409 specifies how to extract a value for the "target" field from an event. As is illustrated in FIG. 4, extraction rules 408-409 can comprise regular expressions that specify how to extract values for the relevant fields. Such regular-expression-based extraction rules are also referred to as "regex rules." In addition to specifying how to extract field values, the extraction rules may also include instructions for deriving a field value by performing a function on a character string or value retrieved by the extraction rule. For example, a transformation rule may truncate a character string, or convert the character string into a different data format. In some cases, the query itself can specify one or more extraction rules.

Next, query processor 404 sends extraction rules 408-409 to a field extractor 412, which applies extraction rules 408-409 to events 416-418 in a data store 414. Note that data store 414 can include one or more data stores, and extraction rules 408-409 can be applied to large numbers of events in data store 414, and are not meant to be limited to the three events 416-418 illustrated in FIG. 4. Moreover, the query processor 404 can instruct field extractor 412 to apply the extraction rules to all the events in a data store 414, or to a subset of the events that have been filtered based on some criteria.

Next, field extractor 412 applies extraction rule 408 for the first command "Search IP="10*"" to events in data store 414 including events 416-418. Extraction rule 408 is used to extract values for the IP address field from events in data store 414 by looking for a pattern of one or more digits, followed by a period, followed again by one or more digits, followed by another period, followed again by one or more digits, followed by another period, and followed again by one or more digits. Next, field extractor 412 returns field values 420 to query processor 404, which uses the criterion IP="10*" to look for IP addresses that start with "10". Note that events 416 and 417 match this criterion, but event 418 does not, so the result set for the first command is events 416-417.

Query processor 404 then sends events 416-417 to the next command "stats count target." To process this command, query processor 404 causes field extractor 412 to apply extraction rule 409 to events 416-417. Extraction rule 409 is used to extract values for the target field for events 416-417 by skipping the first four commas in events 416-417, and then extracting all of the following characters until a comma or period is reached. Next, field extractor 412 returns field values 421 to query processor 404, which executes the command "stats count target" to count the number of unique values contained in the target fields, which in this example produces the value "2" that is returned as a final result 422 for the query.

Note that query results can be returned to a client, a search head, or any other system component for further processing. In general, query results may include: a set of one or more events; a set of one or more values obtained from the events; a subset of the values; statistics calculated based on the values; a report containing the values; or a visualization, such as a graph or chart, generated from the values.

1.6 Exemplary Search Screen

Figure 6A:
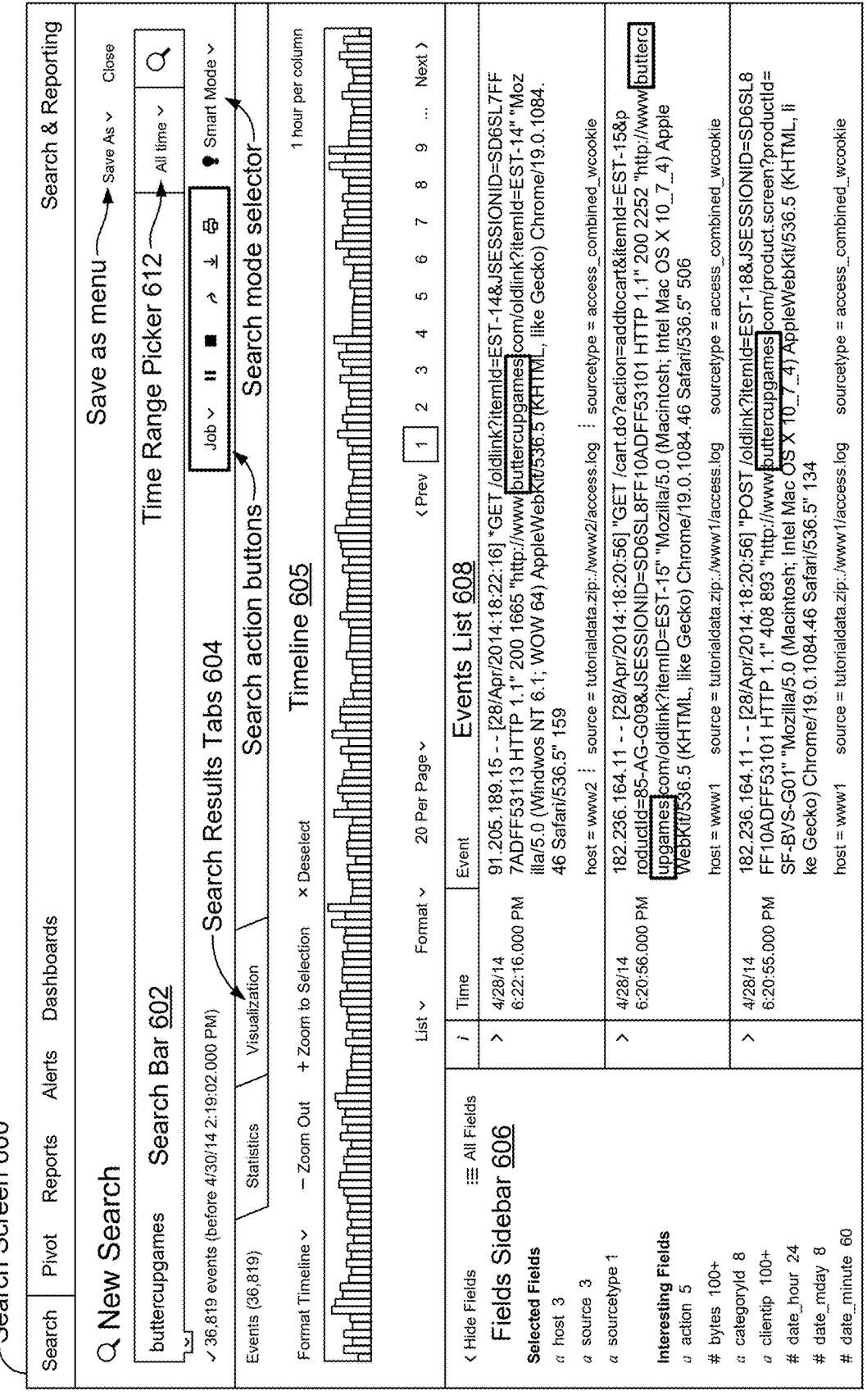
FIG. 6A illustrates a search screen in accordance with the disclosed embodiments.

FIG. 6A illustrates an exemplary search screen 600 in accordance with the disclosed embodiments. Search screen 600 includes a search bar 602 that accepts user input in the form of a search string. It also includes a time range picker 612 that enables the user to specify a time range for the search. For "historical searches" the user can select a specific time range, or alternatively a relative time range, such as "today," "yesterday" or "last week." For "real-time searches," the user can select the size of a preceding time window to search for real-time events. Search screen 600 also initially displays a "data summary" dialog as is illustrated in FIG. 6B that enables the user to select different sources for the event data, for example by selecting specific hosts and log files.

After the search is executed, the search screen 600 can display the results through search results tabs 604, wherein search results tabs 604 includes: an "events tab" that displays various information about events returned by the search; a "statistics tab" that displays statistics about the search results; and a "visualization tab" that displays various visualizations of the search results. The events tab illustrated in FIG. 6A displays a timeline graph 605 that graphically illustrates the number of events that occurred in one-hour intervals over the selected time range. It also displays an events list 608 that enables a user to view the raw data in each of the returned events. It additionally displays a fields sidebar 606 that includes statistics about occurrences of specific fields in the returned events, including "selected fields" that are pre-selected by the user, and "interesting fields" that are automatically selected by the system based on pre-specified criteria.

1.7 Acceleration Techniques

The above-described system provides significant flexibility by enabling a user to analyze massive quantities of minimally processed performance data "on the fly" at search time instead of storing pre-specified portions of the performance data in a database at ingestion time. This flexibility enables a user to see correlations in the performance data and perform subsequent queries to examine interesting aspects of the performance data that may not have been apparent at ingestion time.

However, performing extraction and analysis operations at search time can involve a large amount of data and require a large number of computational operations, which can cause considerable delays while processing the queries. Fortunately, a number of acceleration techniques have been developed to speed up analysis operations performed at search time. These techniques include: (1) performing search operations in parallel by formulating a search as a map-reduce computation; (2) using a keyword index; (3) using a high performance analytics store; and (4) accelerating the process of generating reports. These techniques are described in more detail below.

1.7.1 Map-Reduce Technique

To facilitate faster query processing, a query can be structured as a map-reduce computation, wherein the "map" operations are delegated to the indexers, while the corresponding "reduce" operations are performed locally at the search head. For example, FIG. 5 illustrates how a search query 501 received from a client at search head 104 can split into two phases, including: (1) a "map phase" comprising subtasks 502 (e.g., data retrieval or simple filtering) that may be performed in parallel and are "mapped" to indexers 102*a-c* for execution, and (2) a "reduce phase" comprising a merging operation 503 to be executed by the search head when the results are ultimately collected from the indexers.

During operation, upon receiving search query 501, search head 104 modifies search query 501 by substituting "stats" with "prestats" to produce search query 502, and then distributes search query 502 to one or more distributed indexers, which are also referred to as "search peers." Note that search queries may generally specify search criteria or operations to be performed on events that meet the search criteria. Search queries may also specify field names, as well as search criteria for the values in the fields or operations to be performed on the values in the fields. Moreover, the search head may distribute the full search query to the search peers as is illustrated in FIG. 3, or may alternatively distribute a modified version (e.g., a more restricted version) of the search query to the search peers. In this example, the indexers are responsible for producing the results and sending them to the search head. After the indexers return the results to the search head, the search head performs the merging operations 503 on the results. Note that by executing the computation in this way, the system effectively distributes the computational operations while minimizing data transfers.

1.7.2 Keyword Index

As described above with reference to the flow charts in FIGS. 2 and 3, event-processing system 100 can construct and maintain one or more keyword indices to facilitate rapidly identifying events containing specific keywords. This can greatly speed up the processing of queries involving specific keywords. As mentioned above, to build a keyword index, an indexer first identifies a set of keywords. Then, the indexer includes the identified keywords in an index, which associates each stored keyword with references to events containing that keyword, or to locations within events where that keyword is located. When an indexer subsequently receives a keyword-based query, the indexer can access the keyword index to quickly identify events containing the keyword.

1.7.3 High Performance Analytics Store

To speed up certain types of queries, some embodiments of system 100 make use of a high performance analytics store, which is referred to as a "summarization table," that contains entries for specific field-value pairs. Each of these entries keeps track of instances of a specific value in a specific field in the event data and includes references to events containing the specific value in the specific field. For example, an exemplary entry in a summarization table can keep track of occurrences of the value "94107" in a "ZIP code" field of a set of events, wherein the entry includes references to all of the events that contain the value "94107" in the ZIP code field. This enables the system to quickly process queries that seek to determine how many events have a particular value for a particular field, because the system can examine the entry in the summarization table to count instances of the specific value in the field without having to go through the individual events or do extractions at search time. Also, if the system needs to process all events that have a specific field-value combination, the system can use the references in the summarization table entry to directly access the events to extract further information without having to search all of the events to find the specific field-value combination at search time.

In some embodiments, the system maintains a separate summarization table for each of the above-described time-specific buckets that stores events for a specific time range, wherein a bucket-specific summarization table includes entries for specific field-value combinations that occur in events in the specific bucket. Alternatively, the system can maintain a separate summarization table for each indexer, wherein the indexer-specific summarization table only includes entries for the events in a data store that is managed by the specific indexer.

The summarization table can be populated by running a "collection query" that scans a set of events to find instances of a specific field-value combination, or alternatively instances of all field-value combinations for a specific field. A collection query can be initiated by a user, or can be scheduled to occur automatically at specific time intervals. A collection query can also be automatically launched in response to a query that asks for a specific field-value combination.

In some cases, the summarization tables may not cover all of the events that are relevant to a query. In this case, the system can use the summarization tables to obtain partial results for the events that are covered by summarization tables, but may also have to search through other events that are not covered by the summarization tables to produce additional results. These additional results can then be combined with the partial results to produce a final set of results for the query. This summarization table and associated techniques are described in more detail in U.S. Pat. No. 8,682,925, issued on Mar. 25, 2014.

1.7.4 Accelerating Report Generation

In some embodiments, a data server system such as the SPLUNK® ENTERPRISE system can accelerate the process of periodically generating updated reports based on query results. To accelerate this process, a summarization engine automatically examines the query to determine whether generation of updated reports can be accelerated by creating intermediate summaries. (This is possible if results from preceding time periods can be computed separately and combined to generate an updated report. In some cases, it is not possible to combine such incremental results, for example where a value in the report depends on relationships between events from different time periods.) If reports can be accelerated, the summarization engine periodically generates a summary covering data obtained during a latest non-overlapping time period. For example, where the query seeks events meeting a specified criteria, a summary for the time period includes only events within the time period that meet the specified criteria. Similarly, if the query seeks statistics calculated from the events, such as the number of events that match the specified criteria, then the summary for the time period includes the number of events in the period that match the specified criteria.

In parallel with the creation of the summaries, the summarization engine schedules the periodic updating of the report associated with the query. During each scheduled report update, the query engine determines whether intermediate summaries have been generated covering portions of the time period covered by the report update. If so, then the report is generated based on the information contained in the summaries. Also, if additional event data has been received and has not yet been summarized, and is required to generate the complete report, the query can be run on this additional event data. Then, the results returned by this query on the additional event data, along with the partial results obtained from the intermediate summaries, can be combined to generate the updated report. This process is repeated each time the report is updated. Alternatively, if the system stores events in buckets covering specific time ranges, then the summaries can be generated on a bucket-by-bucket basis. Note that producing intermediate summaries can save the work involved in re-running the query for previous time periods, so only the newer event data needs to be processed while generating an updated report. These report acceleration techniques are described in more detail in U.S. Pat. No. 8,589,403, issued on Nov. 19, 2013, and U.S. Pat. No. 8,412,696, issued on Apr. 2, 2011.

1.8 Security Features

The SPLUNK® ENTERPRISE platform provides various schemas, dashboards and visualizations that make it easy for developers to create applications to provide additional capabilities. One such application is the SPLUNK® APP FOR ENTERPRISE SECURITY, which performs monitoring and alerting operations and includes analytics to facilitate identifying both known and unknown security threats based on large volumes of data stored by the SPLUNK® ENTERPRISE system. This differs significantly from conventional Security Information and Event Management (SIEM) systems that lack the infrastructure to effectively store and analyze large volumes of security-related event data. Traditional SIEM systems typically use fixed schemas to extract data from pre-defined security-related fields at data ingestion time, wherein the extracted data is typically stored in a relational database. This data extraction process (and associated reduction in data size) that occurs at data ingestion time inevitably hampers future incident investigations, when all of the original data may be needed to determine the root cause of a security issue, or to detect the tiny fingerprints of an impending security threat.

In contrast, the SPLUNK® APP FOR ENTERPRISE SECURITY system stores large volumes of minimally processed security-related data at ingestion time for later retrieval and analysis at search time when a live security threat is being investigated. To facilitate this data retrieval process, the SPLUNK® APP FOR ENTERPRISE SECURITY provides pre-specified schemas for extracting relevant values from the different types of security-related event data, and also enables a user to define such schemas.

The SPLUNK® APP FOR ENTERPRISE SECURITY can process many types of security-related information. In general, this security-related information can include any information that can be used to identify security threats. For example, the security-related information can include network-related information, such as IP addresses, domain names, asset identifiers, network traffic volume, uniform resource locator strings, and source addresses. (The process of detecting security threats for network-related information is further described in U.S. patent application Ser. Nos. 13/956,252, and 13/956,262.) Security-related information can also include endpoint information, such as malware infection data and system configuration information, as well as access control information, such as login/logout information and access failure notifications. The security-related information can originate from various sources within a data center, such as hosts, virtual machines, storage devices and sensors. The security-related information can also originate from various sources in a network, such as routers, switches, email servers, proxy servers, gateways, firewalls and intrusion-detection systems.

During operation, the SPLUNK® APP FOR ENTERPRISE SECURITY facilitates detecting so-called "notable events" that are likely to indicate a security threat. These notable events can be detected in a number of ways: (1) an analyst can notice a correlation in the data and can manually identify a corresponding group of one or more events as "notable;" or (2) an analyst can define a "correlation search" specifying criteria for a notable event, and every time one or more events satisfy the criteria, the application can indicate that the one or more events are notable. An analyst can alternatively select a pre-defined correlation search provided by the application. Note that correlation searches can be run continuously or at regular intervals (e.g., every hour) to search for notable events. Upon detection, notable events can be stored in a dedicated "notable events index," which can be subsequently accessed to generate various visualizations containing security-related information. Also, alerts can be generated to notify system operators when important notable events are discovered.

Figure 7A:
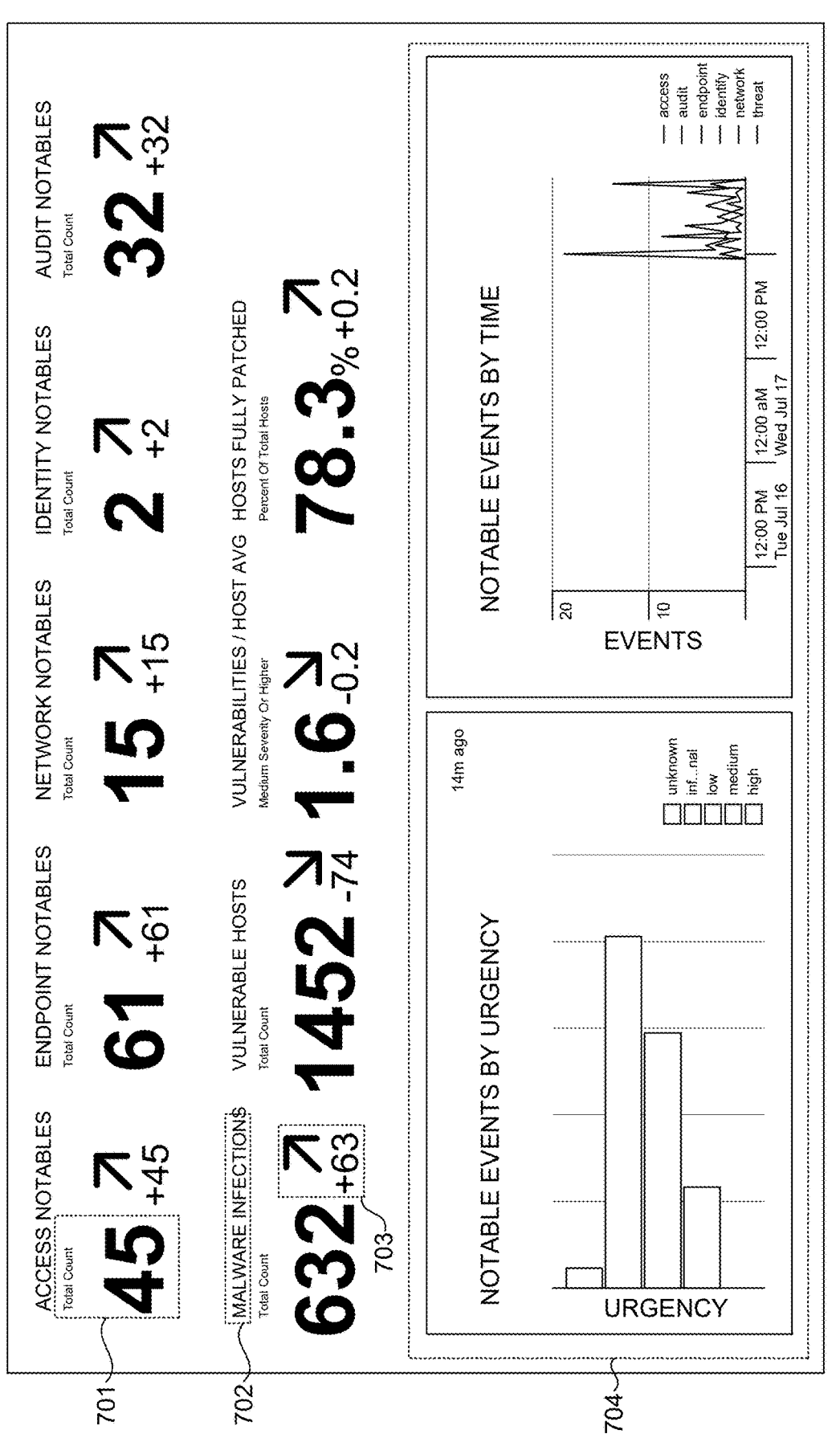
FIG. 7A illustrates a key indicators view in accordance with the disclosed embodiments.

The SPLUNK® APP FOR ENTERPRISE SECURITY provides various visualizations to aid in discovering security threats, such as a "key indicators view" that enables a user to view security metrics of interest, such as counts of different types of notable events. For example, FIG. 7A illustrates an exemplary key indicators view 700 that comprises a dashboard, which can display a value 701, for various security-related metrics, such as malware infections 702. It can also display a change in a metric value 703, which indicates that the number of malware infections increased by 63 during the preceding interval. Key indicators view 700 additionally displays a histogram panel 704 that displays a histogram of notable events organized by urgency values, and a histogram of notable events organized by time intervals. This key indicators view is described in further detail in pending U.S. patent application Ser. No. 13/956,338 filed Jul. 31, 2013.

Figure 7B:
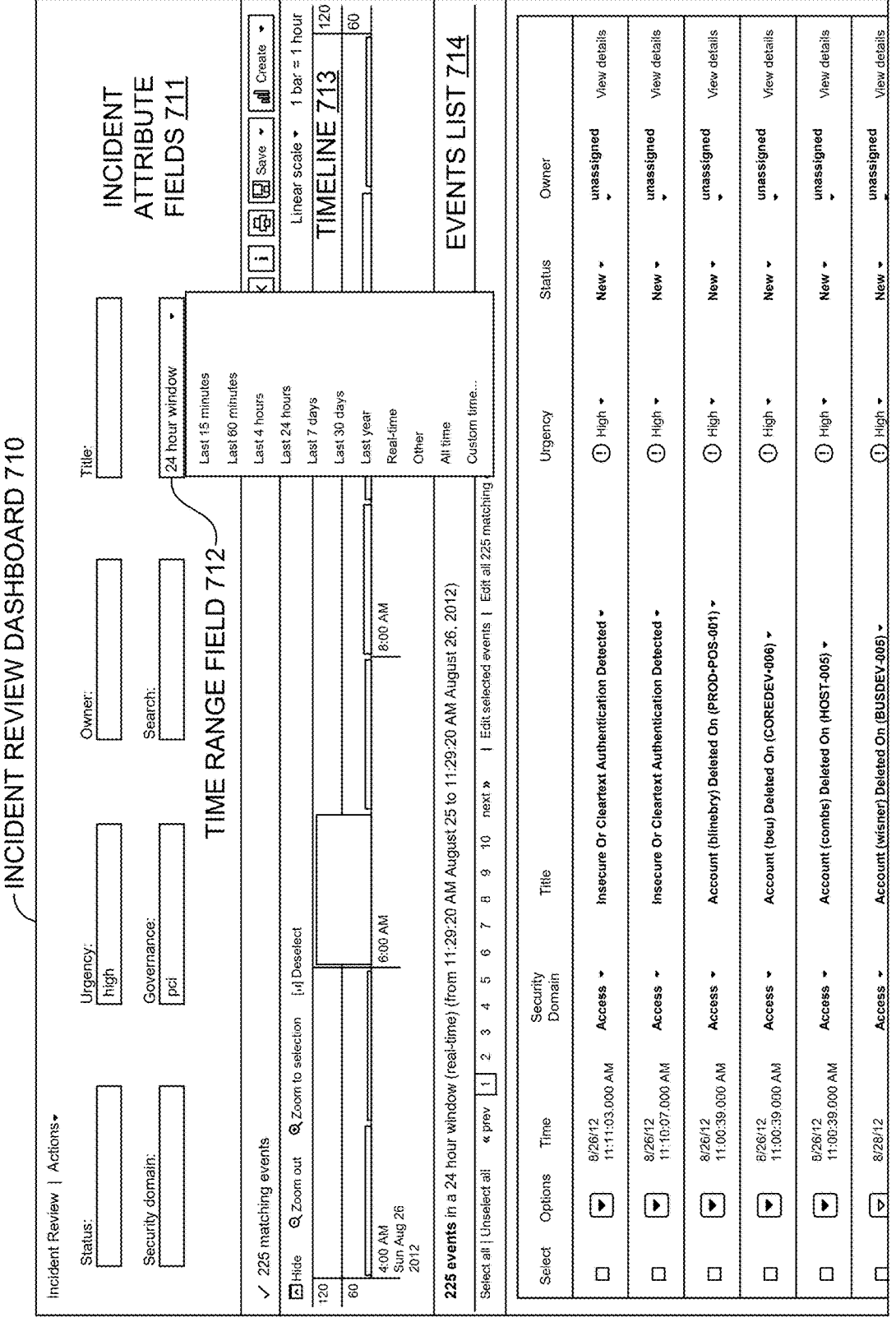
FIG. 7B illustrates an incident review dashboard in accordance with the disclosed embodiments.

These visualizations can also include an "incident review dashboard" that enables a user to view and act on "notable events." These notable events can include: (1) a single event of high importance, such as any activity from a known web attacker; or (2) multiple events that collectively warrant review, such as a large number of authentication failures on a host followed by a successful authentication. For example, FIG. 7B illustrates an exemplary incident review dashboard

710 that includes a set of incident attribute fields 711 that, for example, enables a user to specify a time range field 712 for the displayed events. It also includes a timeline 713 that graphically illustrates the number of incidents that occurred in one-hour time intervals over the selected time range. It additionally displays an events list 714 that enables a user to view a list of all of the notable events that match the criteria in the incident attributes fields 711. To facilitate identifying patterns among the notable events, each notable event can be associated with an urgency value (e.g., low, medium, high, critical), which is indicated in the incident review dashboard. The urgency value for a detected event can be determined based on the severity of the event and the priority of the system component associated with the event. The incident review dashboard is described further in "http://docs.splunk.com/Documentation/PCI/2.1.1/User/IncidentReviewdashboard."

1.9 Data Center Monitoring

As mentioned above, the SPLUNK® ENTERPRISE platform provides various features that make it easy for developers to create various applications. One such application is the SPLUNK® APP FOR VMWARE®, which performs monitoring operations and includes analytics to facilitate diagnosing the root cause of performance problems in a data center based on large volumes of data stored by the SPLUNK® ENTERPRISE system.

This differs from conventional data-center-monitoring systems that lack the infrastructure to effectively store and analyze large volumes of performance information and log data obtained from the data center. In conventional data-center-monitoring systems, this performance data is typically pre-processed prior to being stored, for example by extracting pre-specified data items from the performance data and storing them in a database to facilitate subsequent retrieval and analysis at search time. However, the rest of the performance data is not saved and is essentially discarded during pre-processing. In contrast, the SPLUNK® APP FOR VMWARE® stores large volumes of minimally processed performance information and log data at ingestion time for later retrieval and analysis at search time when a live performance issue is being investigated.

The SPLUNK® APP FOR VMWARE® can process many types of performance-related information. In general, this performance-related information can include any type of performance-related data and log data produced by virtual machines and host computer systems in a data center. In addition to data obtained from various log files, this performance-related information can include values for performance metrics obtained through an application programming interface (API) provided as part of the vSphere Hypervisor™ system distributed by VMware, Inc. of Palo Alto, California. For example, these performance metrics can include: (1) CPU-related performance metrics; (2) disk-related performance metrics; (3) memory-related performance metrics; (4) network-related performance metrics; (5) energy-usage statistics; (6) data-traffic-related performance metrics; (7) overall system availability performance metrics; (8) cluster-related performance metrics; and (9) virtual machine performance statistics. For more details about such performance metrics, please see U.S. patent Ser. No. 14/167,316 filed 29 Jan. 2014, which is hereby incorporated herein by reference. Also, see "vSphere Monitoring and Performance," Update 1, vSphere 5.5, EN-001357-00, http://pubs.vmware.com/vsphere-55/topic/com.vmware.ICbase/PDF/vsphere-esxi-vcenter-server-551-monitoring-performance-guide.pdf.

To facilitate retrieving information of interest from performance data and log files, the SPLUNK® APP FOR VMWARE® provides pre-specified schemas for extracting relevant values from different types of performance-related event data, and also enables a user to define such schemas.

Figure 7C:
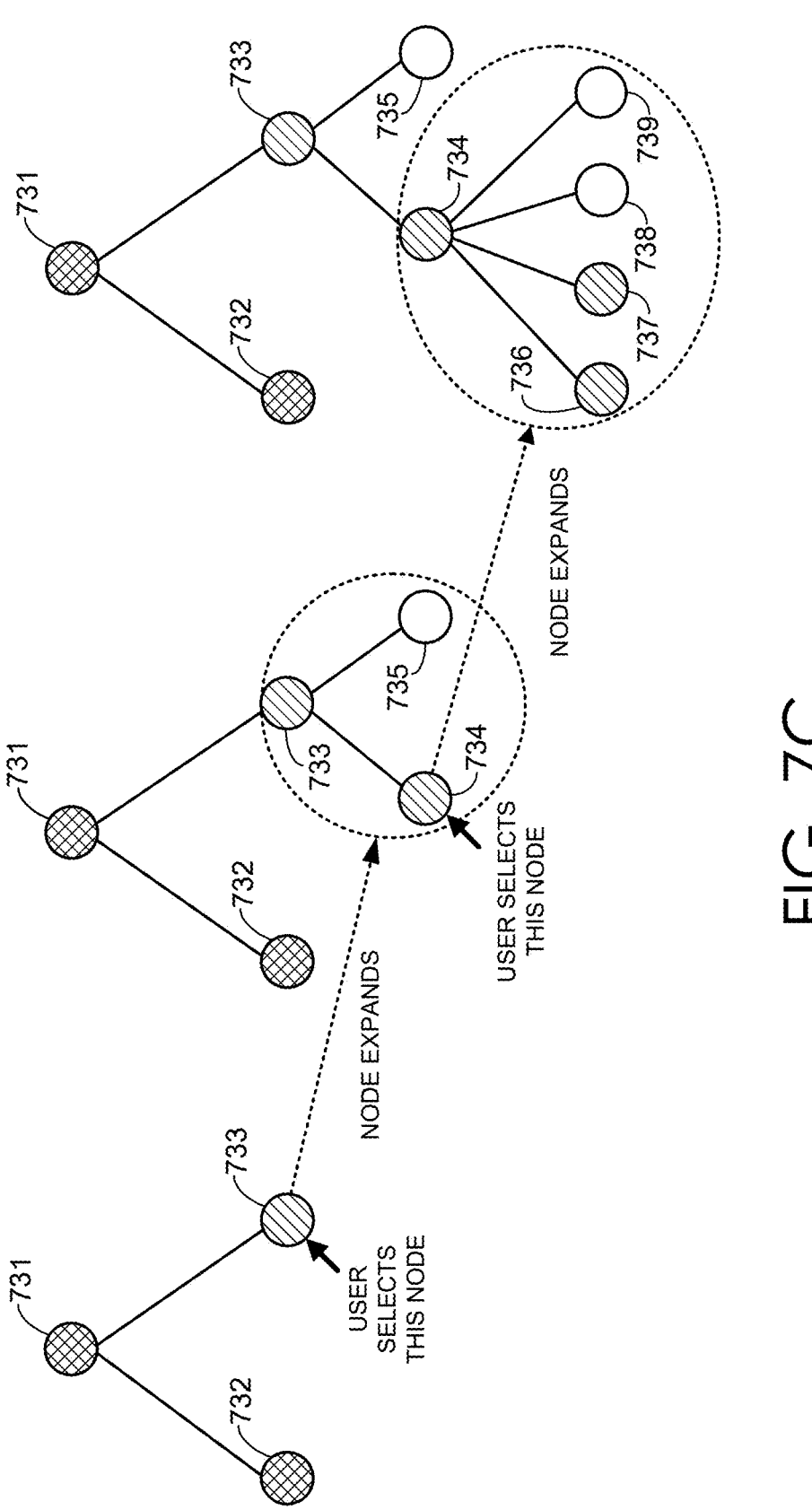
FIG. 7C illustrates a proactive monitoring tree in accordance with the disclosed embodiments.

The SPLUNK® APP FOR VMWARE® additionally provides various visualizations to facilitate detecting and diagnosing the root cause of performance problems. For example, one such visualization is a "proactive monitoring tree" that enables a user to easily view and understand relationships among various factors that affect the performance of a hierarchically structured computing system. This proactive monitoring tree enables a user to easily navigate the hierarchy by selectively expanding nodes representing various entities (e.g., virtual centers or computing clusters) to view performance information for lower-level nodes associated with lower-level entities (e.g., virtual machines or host systems). Exemplary node-expansion operations are illustrated in FIG. 7C, wherein nodes 733 and 734 are selectively expanded. Note that nodes 731-739 can be displayed using different patterns or colors to represent different performance states, such as a critical state, a warning state, a normal state or an unknown/offline state. The ease of navigation provided by selective expansion in combination with the associated performance-state information enables a user to quickly diagnose the root cause of a performance problem. The proactive monitoring tree is described in further detail in U.S. patent application Ser. No. 14/235,490 filed on 15 Apr. 2014, which is hereby incorporated herein by reference for all possible purposes.

Figure 7D:
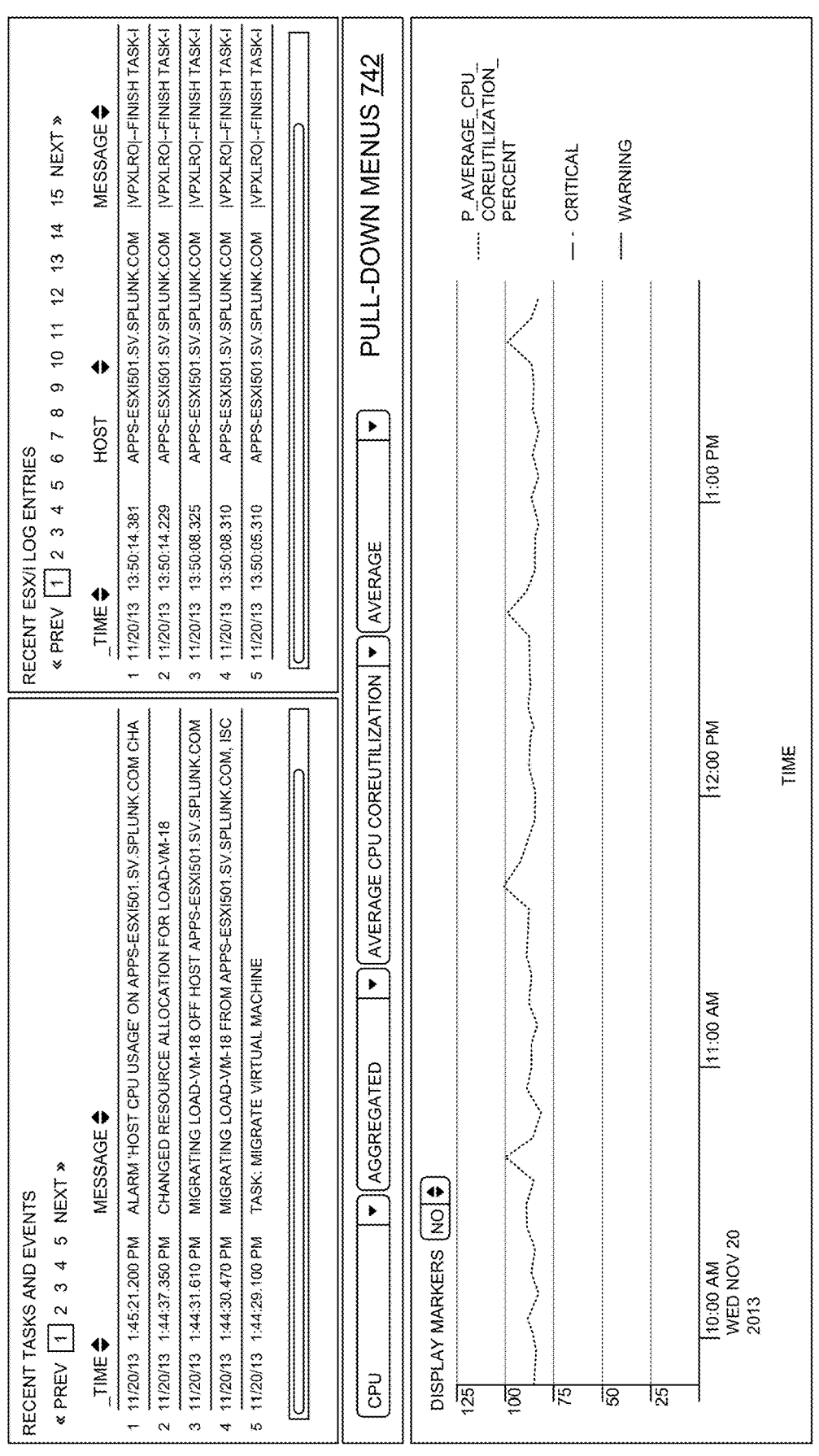
FIG. 7D illustrates a screen displaying both log data and performance data in accordance with the disclosed embodiments.

The SPLUNK® APP FOR VMWARE® also provides a user interface that enables a user to select a specific time range and then view heterogeneous data, comprising events, log data and associated performance metrics, for the selected time range. For example, the screen illustrated in FIG. 7D displays a listing of recent "tasks and events" and a listing of recent "log entries" for a selected time range above a performance-metric graph for "average CPU core utilization" for the selected time range. Note that a user is able to operate pull-down menus 742 to selectively display different performance metric graphs for the selected time range. This enables the user to correlate trends in the performance-metric graph with corresponding event and log data to quickly determine the root cause of a performance problem. This user interface is described in more detail in U.S. patent application Ser. No. 14/167,316 filed on 29 Jan. 2014, which is hereby incorporated herein by reference for all possible purposes.

2.1 Illustrative Data Processing System

Figure 8:
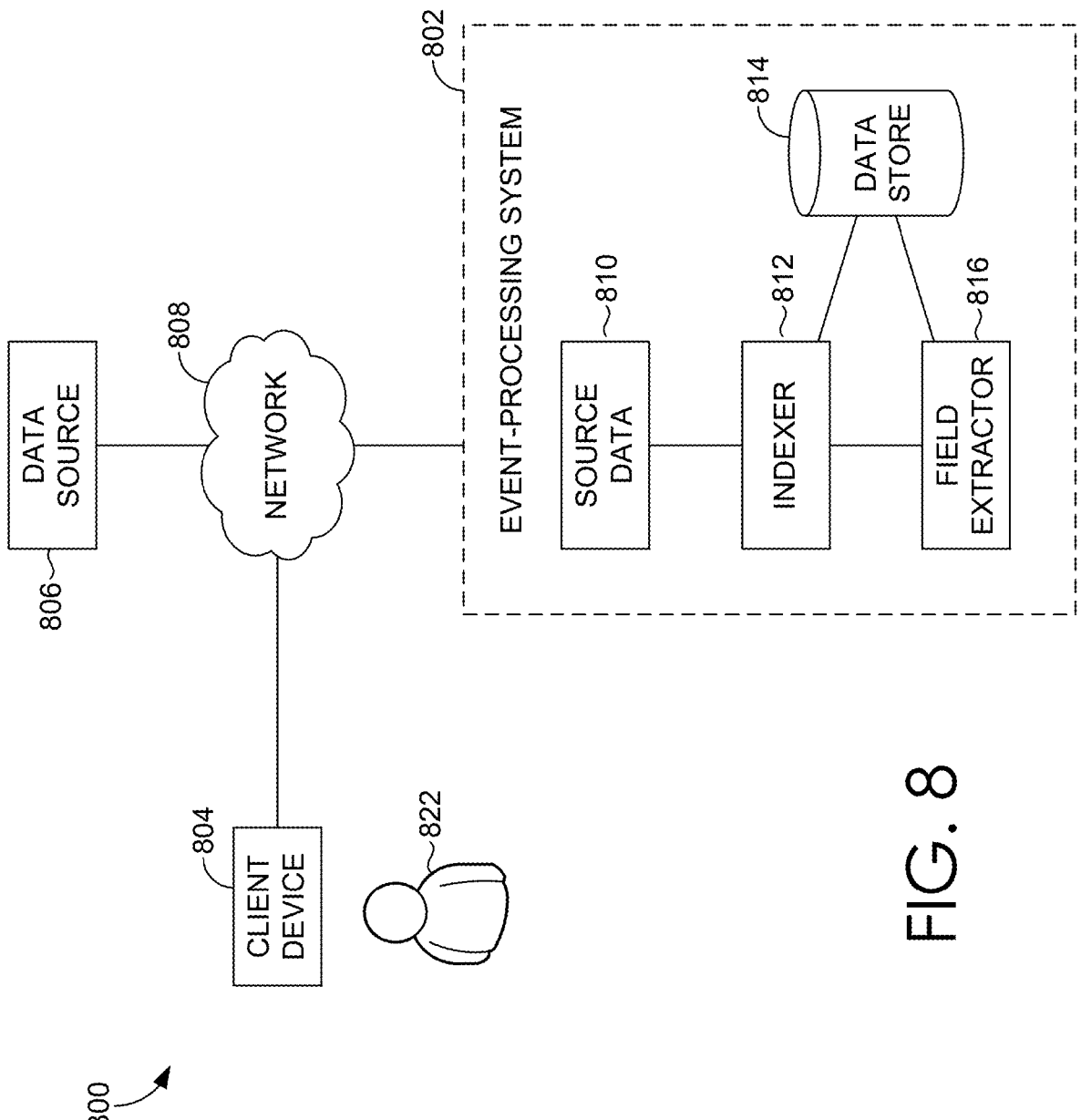
FIG. 8 depicts a block diagram of an illustrative data processing environment in accordance with various embodiments of the present disclosure.

FIG. 8 illustrates an example data processing environment 800 in accordance with the disclosed embodiments. At a high-level, data processing environment 800 facilitates field extraction or identification utilizing regular expression rules and/or delimiter rules. In this regard, regular expression rules and/or delimiter rules are applied to a data set (e.g., set of events) to identify and/or extract values (field values) for fields. Fields may be defined by extraction rules that are applied to data (e.g., in the events) to extract values for specific fields. In particular, extraction rules can include one or more instructions that specify how to extract a value for a field from the data, as described in more detail below. As used herein, field extraction refers generally to the extraction or identification of fields and/or field values within a data set(s), such as events. As described, "field" refers to a location in the event data containing a value for a specific data item. A field value refers to the value within a field.

In some embodiments, the environment can include an event-processing system 802 communicatively coupled to one or more client devices 804 and one or more data sources 806 via a communications network 808. The network 808 may include an element or system that facilitates communication between the entities of the environment 800. The network 808 may include an electronic communications network, such as the Internet, a local area network (LAN), a wide area network (WAN), a wireless local area network (WLAN), a cellular communications network, and/or the like. In some embodiments, the network 808 can include a wired or a wireless network. In some embodiments, the network 808 can include a single network or a combination of networks.

The data source 806 may be a source of incoming source data 810 being fed into the event-processing system 802. A data source 806 can be or include one or more external data sources, such as web servers, application servers, databases, firewalls, routers, operating systems, and software applications that execute on computer systems, mobile devices, sensors, and/or the like. Data source 806 may be located remote from the event-processing system 802. For example, a data source 806 may be defined on an agent computer operating remote from the event-processing system 802, such as on-site at a customer's location, that transmits source data 810 to event-processing system 802 via a communications network (e.g., network 808).

Source data 810 can be a stream or set of data fed to an entity of the event-processing system 802, such as a forwarder (not shown) or an indexer 812. In some embodiments, the source data 810 can be heterogeneous machine-generated data received from various data sources 806, such as servers, databases, applications, networks, and/or the like. Source data 810 may include, for example raw data (e.g., raw time-series data), such as server log files, activity log files, configuration files, messages, network packet data, performance measurements, sensor measurements, and/or the like. For example, source data 810 may include log data generated by a server during the normal course of operation (e.g. server log data). In some embodiments, the source data 810 may be minimally processed to generate minimally processed source data. For example, the source data 810 may be received from a data source 806, such as a server. The source data 810 may then be subjected to a small amount of processing to break the data into events. As discussed, an event generally refers to a portion, or a segment of the data, that is associated with a time. And, the resulting events may be indexed (e.g., stored in a raw data file associated with an index file). In some embodiments, indexing the source data 810 may include additional processing, such as compression, replication, and/or the like.

As can be appreciated, source data 810 might be structured data or unstructured data. Structured data has a predefined format, wherein specific data items with specific data formats reside at predefined locations in the data. For example, data contained in relational databases and spreadsheets may be structured data sets. In contrast, unstructured data does not have a predefined format. This means that unstructured data can comprise various data items having different data types that can reside at different locations.

The indexer 812 of the event-processing system 802 receives the source data 810, for example, from a forwarder (not shown) or the data source 806, and apportions the source data 810 into events. An indexer 812 may be an entity of the event-processing system 802 that indexes data, transforming source data 810 into events and placing the results into a data store 814, or index. Indexer 812 may also search data stores 814 in response to requests or queries. An indexer 812 may perform other functions, such as data input and search management. In some cases, forwarders (not shown) handle data input, and forward the source data 810 to the indexers 812 for indexing.

During indexing, and at a high-level, the indexer 812 can facilitate taking data from its origin in sources, such as log files and network feeds, to its transformation into searchable events that encapsulate valuable knowledge. The indexer 812 may acquire a raw data stream (e.g., source data 810) from its source (e.g., data source 806), break it into blocks (e.g., 64K blocks of data), and/or annotate each block with metadata keys. After the data has been input, the data can be parsed. This can include, for example, identifying event boundaries, identifying event timestamps (or creating them if they don't exist), masking sensitive event data (such as credit card or social security numbers), applying custom metadata to incoming events, and/or the like. Accordingly, the raw data may be data broken into individual events. The parsed data (also referred to as "events") may be written to a data store, such as an index or data store 814.

The data store 814 may include a medium for the storage of data thereon. For example, data store 814 may include non-transitory computer-readable medium storing data thereon that is accessible by entities of the environment 800, such as the corresponding indexer 812 and the field extractor 816. As can be appreciated, the data store 814 may store the data (e.g., events) in any manner. In some implementations, the data may include one or more indexes including one or more buckets, and the buckets may include an index file and/or raw data file (e.g., including parsed, time-stamped events). In some embodiments, each data store is managed by a given indexer that stores data to the data store and/or performs searches of the data stored on the data store. Although certain embodiments are described with regard to a single data store 814 for purposes of illustration, embodiments may include employing multiple data stores 814, such as a plurality of distributed data stores 814.

As described, events within the data store 814 may be represented by a data structure that is associated with a certain point in time and includes a portion of raw machine data (e.g., a portion of machine-generated data that has not been manipulated). An event may include, for example, a line of data that includes a time reference (e.g., a timestamp), and one or more other values. In the context of server log data, for example, an event may correspond to a log entry for a client request and include the following values: (a) a time value (e.g., including a value for the data and time of the request, such as a timestamp), and (b) a series of other values including, for example, a page value (e.g., including a value representing the page requested), an IP (Internet Protocol) value (e.g., including a value for representing the client IP address associated with the request), and an HTTP (Hypertext Transfer protocol) code value (e.g., including a value representative of an HTTP status code), and/or the like. That is, each event may be associated with one or more values. Some events may be associated with default values, such as a host value, a source value, a source type value and/or a time value. A default value may be common to some of all events of a set of source data.

In some embodiments, an event can be associated with one or more characteristics that are not represented by the data initially contained in the raw data, such as characteristics of the host, the source, and/or the source type associated with the event. In the context of server log data, for example, if an event corresponds to a log entry received from Server A, the host and the source of the event may be identified as Server A, and the source type may be determined to be "server." In some embodiments, values representative of the characteristics may be added to (or otherwise associated with) the event. In the context of server log data, for example, if an event is received from Server A, a host value (e.g., including a value representative of Server A), a source value (e.g., including a value representative of Server A), and a source type value (e.g., including a value representative of a "server") may be appended to (or otherwise associated with) the corresponding event.

In some embodiments, events can correspond to data that is generated on a regular basis and/or in response to the occurrence of a given event. In the context of server log data, for example, a server that logs activity every second may generate a log entry every second, and the log entries may be stored as corresponding events of the source data. Similarly, a server that logs data upon the occurrence of an error event may generate a log entry each time an error occurs, and the log entries may be stored as corresponding events of the source data.

In accordance with events being stored in the data store 814, the field extractor 816 can function to perform field extraction in relation to the events. As such, field extractor 816 generally extracts or identifies field values associated with fields in the events. As described herein, the field extractor 816 applies extraction rules to events to extract values for specific fields within the events. Extraction rules can include one or more instructions that specify how to extract a value for the field from the event data. In some cases, an extraction rule comprises a regular expression, in which case the rule is referred to as a "regular expression rule" or a "regex rule." In other cases, an extraction rule is based on a delimiter, in which case the rule is referred to as a "delimiter rule." A delimiter rule may be, for example, a definition of one or more delimiter characters (e.g., "," or "I", or both), an ordered list of field names that are separated by the delimiter character (e.g., represented as DELIMS=", "; FIELDS=field1, field2, field3, for example), or the like.

Although field extractor 816 is illustrated and described herein as a separate component, this is for illustrative purposes. As can be appreciated, the field extractor 816, or functions described in association therewith, can be performed at the indexer 812 or a search head (not shown). For example, some functionality described in association with the field extractor 816 might be performed at a search head, while other functionality described in association with the field extractor 816 might be performed at an indexer.

As described herein, field extraction can be initiated by a user of the client device 804. The client device 804 may be used or otherwise accessed by a user 822, such as a system administrator or a customer. A client device 804 may include any variety of electronic devices. In some embodiments, a client device 804 can include a device capable of communicating information via the network 808. A client device 804 may include one or more computer devices, such as a desktop computer, a server, a laptop computer, a tablet computer, a wearable computer device, a personal digital assistant (PDA), a smart phone, and/or the like. In some embodiments, a client device 804 may be a client of the event processing system 802. In some embodiments, a client device 804 can include various input/output (I/O) interfaces, such as a display (e.g., for displaying a graphical user interface (GUI), an audible output user interface (e.g., a speaker), an audible input user interface (e.g., a microphone), an image acquisition interface (e.g., a camera), a keyboard, a pointer/selection device (e.g., a mouse, a trackball, a touchpad, a touchscreen, a gesture capture or detecting device, or a stylus), and/or the like. In some embodiments, a client device 804 can include general computing components and/or embedded systems optimized with specific components for performing specific tasks. In some embodiments, a client device 804 can include programs/applications that can be used to generate a request for content, to provide content, to render content, and/or to send and/or receive requests to and/or from other devices via the network 808. For example, a client device 804 may include an Internet browser application that facilitates communication with the event-processing system 802 via the network 808. In some embodiments, a program, or application, of a client device 804 can include program modules having program instructions that are executable by a computer system to perform some or all of the functionality described herein with regard to at least client device 804. In some embodiments, a client device 804 can include one or more computer systems similar to that of the computer system 2700 described below with regard to at least FIG. 27.

Field extraction can be initiated or triggered at the client device 804 via a field extraction graphical user interface (GUI). In some embodiments, the field extractor 816 can provide for the display of a field extraction (GUI). Such a field extraction GUI can be displayed on a client device 804, and can present information relating to initiating field extraction, performing field extraction, and viewing results of field extraction. Such a field extraction graphical user interface presented on client device 804 is described in more detail below.

Field extraction can be initiated at a client device by a user at any time. In this regard, a user may initiate field extraction prior to or in accordance with performing a search for information. Although generally described herein as performing field extraction upon the events being created, indexed, and stored, extraction rules can be defined and applied as events are created, indexed, and/or stored. Further, field extraction may be automatically triggered. For example, upon initially establishing a field extraction, subsequent field extractions may be automatically triggered and performed as new data is received.

The field extractor 816 is generally configured to facilitate field extraction. To extract fields or field values from events, the field extractor 816 can determine an extraction mode to apply to an extraction. An extraction mode refers to a method of performing extraction in accordance with a type of extraction rule(s). As described herein, a type of extraction rule might be a regular expression extraction rule or a delimiter extraction rule. A regular expression extraction rule specifies how to extract values for the relevant fields. In particular, a regular expression rule refers to a sequence of characters that define a search pattern, mainly for use in pattern matching with strings, or string matching. Such regular-expression-based extraction rules are also referred to as "regex rules." A delimiter extraction rule specifies field boundaries that may be indicated by predefined characters or character strings. These predefined characters may include punctuation marks or other special characters including, for example, carriage returns, tabs, spaces, line breaks, commas, semi-colons, colons, ampersand, apostrophe, asterisk, @, back slash, braces, brackets, carats, parenthesis, percent, pound, underscore, forward slash, etc. In some cases, a user can fine-tune or configure the rules used to determine field boundaries in order to adapt the rules to the user's specific requirements.

An extraction mode to apply to extract field values from events can be determined based on receiving an indication of a user selection of an extraction mode. For example, the user

822 operating client device 804 may select one of a regular expression mode or a delimiter mode for use in extracting field values. In this regard, the field extractor 816 can provide the field extractor GUI to the client device 804 having an option of whether to perform field value extraction using a regular expression mode and/or a delimiter mode. The user can then select, via the user interface, a preferred extraction mode based on the data from which field values are being extracted. For example, a regular expression mode might be selected when the underlying data is unstructured. On the other hand, a delimiter mode might be selected when the underlying data is structured. Generally, a delimiter mode can provide faster results as the user does not need to perform various iterations to remove values or add values to obtain a desired regular expression rule.

In some implementations, the field extractor 816 can provide a recommended extraction mode to the user. In this regard, the field extractor 816 might analyze a specific set of data (e.g., events) for which extraction is to be applied. In analyzing the set of data, data or delimiter patterns might be analyzed within or across the events. For example, when a pattern of a consistent type of delimiters or a same number of delimiters are used within or across events, the data set may be deemed structured data, and as such, a delimiter mode may be recommended to the user. In some cases, a delimiter mode might be recommended when both a same type of delimiter and a consistent number of delimiters is used across events or a threshold number of events. On the other hand, if a same type of delimiter and/or a consistent number of delimiter is not used across events or a threshold number of events, the data can be deemed unstructured data resulting in a regular expression mode being recommended for use in field extraction. Irrespective of an extraction mode being recommended, the field extractor 816 can provide the field extractor GUI to the client device 804 providing an indication of the extraction mode being recommended to the user. In some implementations, the recommended mode may be provided in association with a reason for selection of the recommended mode.

In some cases, prior to determining an extraction mode to apply for field extraction, a source data and/or an event sample can be identified. A source data might be identified such that the field values are extracted from a particular source of data (e.g., a particular set of events). An event sample generally refers to an example event that is indicative of an event from which field values are desired to be extracted. An event sample can be presented to a user to facilitate user selection of an extraction mode, or aspects associated therewith. Source data and/or an event sample can be identified based on receiving an indication of a user selection of source data and/or event sample. For example, user 822 operating client device 804 may select a specific set of source data and/or an event sample from the source data for use in extracting field values. In this regard, the field extractor 816 can provide the field extractor GUI to the client device 804, which includes options of various sources of data and/or event samples. Any source of data and/or event sample selected at the client device 804 can then be provided to the field extractor 816 for use in facilitating field extraction. As can be appreciated, in some cases, source data and/or event samples might be automatically selected. For instance, in the case of availability of only a single source of data, the source data might be selected by default. As another example, a first event, or other event within the source data might be selected as a sample event.

In accordance with an extraction mode determined to be used for extracting field values from events, the field extractor 816 can generate or reference an appropriate extraction rule(s) for use in performing field extraction. To this end, in the event a regular expression mode is selected, an appropriate regex rule can be used to extract field values from events. On the other hand, in the event a delimiter mode is selected, an appropriate delimiter rule can be used to extract field values, as described more fully below.

Upon determining a regular expression mode is to be used to extract fields (e.g., based on a user selection), a regular expression rule can be generated or referenced to utilize for field extraction. A regular expression rule can be generated in accordance with one or more user interactions, for example, via a field extractor GUI presented on the client device, such as client device 804. In this regard, the field extractor GUI can enable a user to make selections to generate a regular expression rule that specifies a desired field extraction. To generate a regular expression rule, initially, the user can select or highlight one or more values in an event to create a field. For example, a value within a sample event presented to a user can be selected. Upon selecting the value, a desired field name can be given to that field. In some cases, the user can select that a value is required, meaning that it must exist in an event for the regular expression to match. As can be appreciated, a user can select to any number of values to generate a regular expression rule(s) for use in extracting field values.

A user can then select to extract field values that correspond with identified field. In connection with selection to extract field values, a regular expression rule that specifies how to extract values for the relevant fields can be generated by the field extractor 816 and applied to extract and/or identify the appropriate field values from other events. Generally, the regular expression rule is a pattern-matching rule that can be applied to each event to identify a pattern. The field values extracted in association with the other events can be highlighted or otherwise indicated in a display of raw events. For example, assume that a protocol field is desired to be extracted. Upon a user indication to extract corresponding field values within other events, a set of events can be presented with each protocol field value highlighted in each event.

In some cases, the regular expression rule for use in extracting field values may be desired to be modified. For example, a user might view the presentation of highlighted values associated with a desired field and recognize that some values were not extracted and/or that some values were mistakenly extracted. In such cases, various methods can be applied to modify field extraction. As one example, a highlighted value in a sample event can be selected to apply a modification. As another example, when a field value was not extracted in association with a field, a user may select an additional event having the desired field value to add it to the set of sample events and, thereafter, select the value therein as belonging to a particular field to improve the extraction related to that field. For instance, assume that a field "participant" is created and the user recognizes an event having a participant name "Tom" that was not recognized and extracted based on a previously generated regex rule. In such a case, the user can select an event having "Tom" as a value as a sample event and, thereafter, select the value "Tom" to improve the regular expression rule such that at least the value "Tom" is extracted. As yet another example, values identified as corresponding with a designated field (e.g., within a set of events) can be removed. For instance, a deletion or removal of field values incorrectly highlighted as applicable to a field can be indicated by a user to modify the corresponding regular expression rule or values extracted in association therewith. As can be appreciated, the regular expression rule being generated for extracting field values is adapted as the user interacts with the fields and field values to result in desired extraction. This may be an iterative process to result in desired field value extractions.

Upon completing and storing the desired field extraction, the existing field extractions can be viewed and/or modified. In this regard, a user can view extractions that have been previously defined. Further, in some cases, the user can modify the existing field extractions, for example, by adding or removing field values in association with a field. As the user can modify the field extractions when viewing existing field extractions, the existing field extractions might be indicated in a manner that is unique from in progress extractions. For example, the values within fields previously extracted might be outlined as opposed to entirely highlighted to distinguish the previously extracted field values. In some implementations, field values associated with a default field name (not provided by a user) may be uniquely identified to notify the user that a specific field label has not been created for that field.

Turning now to a delimiter mode, upon determining a delimiter mode is to be used to extract fields (e.g., based on a user selection), a delimiter rule can be generated or referenced to utilize for field extraction. A delimiter rule can be generated or referenced in accordance with one or more user interactions, for example, via a field extractor GUI presented on the client device, such as client device 804. In this regard, the field extractor GUI can enable a user to make selections to use a delimiter rule that specifies a desired field extraction. To utilize a delimiter rule, initially, the user can select one or more delimiters to use in association with an event(s) to create a field. For example, a delimiter type may be selected from among a plurality of delimiter types for use in extracting field values. As previously described, a delimiter type can be any type of delimiter that is used to separate data, such as, for example, a comma, a tab, a pipe, an asterisk, etc.

In embodiments, the set of possible delimiter types can be presented in association with a sample event or set of events such that the user can view the various delimiters used within the events. Further, in some cases, the set of possible delimiter types presented for display may be based on delimiters identified within the events. In such cases, when a comma and pipe are the only delimiters identified within any number of events, only comma and pipe delimiter options may be presented to the user for selection.

As can be appreciated, in some implementations, the field extractor 816 can provide a recommended delimiter type to the user. In this regard, the field extractor 816 might analyze a specific set of data for which extraction is to be applied. In analyzing the set of data, delimiter patterns might be analyzed within a single event or across the events. For example, when a pattern of a consistent or same number of delimiters are used within events, the delimiter used consistently across events may be recommended to the user. Irrespective of a delimiter type being recommended, the field extractor 816 can provide the field extractor GUI to the client device 804 providing an indication of the delimiter type that is being recommended to the user. In some cases, the recommended type of delimiter may be provided in association with a reason for recommending that particular delimiter type.

Upon selecting a delimiter type, one or more fields are identified or defined within the sample event and/or set of events. In this regard, fields are identified, defined, or generated in accordance with a selected type of delimiter. By way of example only, assume that a comma is selected as a delimiter type to generate fields and/or extract field values. In such a case, a first field can be identified prior to (or after) an occurrence of a first comma, a second field can be identified prior to (or after) an occurrence of a second comma, a third field can be identified prior to (or after) an occurrence of a third comma, etc.

In accordance with selecting a particular delimiter type, a delimiter rule is generated or referenced for extracting field values based on the selected delimiter type. As such, the delimiter rule can be applied to extract various field values from fields within events. Upon extracting the field values corresponding with each field defined by a delimiter, a desired field name can be given to each field. For example, initially, field values corresponding with fields can be extracted and assigned to a default field name (e.g., Field 1, Field 2). Subsequently, a user can provide a field name for the field that describes the field. The extracted field values and corresponding fields can be presented to the user, for example, via the client device 804.

Upon completing and storing the desired field extraction, the existing field extractions can be viewed and/or modified. In this regard, a user can view extractions that have been previously defined. Further, in some cases, the user can modify the existing field extractions, for example, by adding or removing field values in association with a field. As the user can modify the field extractions when viewing existing field extractions, the existing field extractions might be indicated in a manner that is unique from in progress extractions. For example, the values within fields previously extracted might be outlined as opposed to entirely highlighted to distinguish the previously extracted fields and/or field values. A non-default or defined field name can assist a user with viewing data, searching data, and running reports at a later time.

In some implementations, extraction rules can be nested to extract field values in association with fields in various events. For example, a delimiter rule can be nested in a delimiter rule to perform field extraction. As another example, a regular expression rule can be nested in a regular expression rule to perform field extraction. As yet another example, a regular expression rule can be nested in a delimiter rule (or vice versa) to perform field extraction. To this end, both a regular expression mode and a delimiter mode can be applied to extract field values in association with fields in various events. Utilization of multiple or nested extraction rules (e.g., use of a regular expression mode and a delimiter mode) can be advantageous to further define data to extract.

Implementation of nested extraction rules occur in any number of ways. To initiate use of nested extractions, in some embodiments, a user might select use of a nested extraction mode from among a list of extraction modes including the regular expression mode and the delimiter mode. By selecting a nesting extraction mode, a user can be provided with options to generate and utilize nested extraction rules. In other embodiments, a user might initially select use of one of the regular expression mode or a delimiter mode and, thereafter, integrate the use of an additional delimiter extraction rule and/or regular extraction rule to generate a nested extraction rule.

To perform a nested extraction, an extraction might be initially run using a combination of a first extraction rule and a second extraction rule. As described, the nested extraction rule may include any combination of delimiter rules and/or regular expression rules. For instance, assume that a delimiter extraction rule is first applied to an event to separate the event into fields and extract values therefrom. A user may then select one of the delineated fields (e.g., highlight a field name) and define a regular extraction rule in connection with that field to further define the field extraction to apply. The regular extraction rule could be defined by user input of the specific rule or by user interaction with various values and fields in the data.

By way of example only, assume that a sample event is provided: | a: 1 2 3 4 |b: 3 4 5 6 | c: 7 8 9 10 |. Further assume that the user desires to extract the numeric values between each delimiter "|" (e.g., 2, 4, and 8 values). In such a case, a first delimiter of "|" might be initially selected. Utilizing a first delimiter rule, the values "a: 1 2 3 4," "b: 3 4 56," and "c: 7 8 9 10" can be extracted. To extract only the numeric values, a second delimiter rule can be applied to further extract the numeric values. For instance, the delimiter ":" might be selected by the user to extract "1 2 3 4," "3 4 5 6," and "7 8 9 10."

As another example, assume that a sample event is provided: | a: 1_192.168.1.5_2-jesse-3 {baz} | b: 3 {hello} 4 {world}. In this example, the embedded data does not have a consistent delimiter. As such, a regular expression extraction can be used to match strings formatted as an IP address (e.g., \d+\·\d+\·\d+\·\d+) based on a delimiter extraction (e.g., "|").

In some cases, utilization of nesting extractions and/or a particular nesting structure can be recommended to the user, for example, based on the a sample event or analysis of multiple events. By way of example only, after extracting field values in one manner, such as using a delimiter rule, the values within the defined fields can be scanned to recognize whether an additional extraction (e.g., delimiter or regular expression) might be desired or useful.

2.2 Illustrative User Interfaces Used in Association with Field Extraction

FIGS. 9-23 illustrate various screen displays associated with an interactive graphical user interface (GUI) that can be provided to enable a user to initiate and/or manage field extraction and to review extraction results. In particular, such an interactive GUI can be a field extractor GUI provided to a user via a client device, such as client device 804 of FIG. 8.

Figure 9:
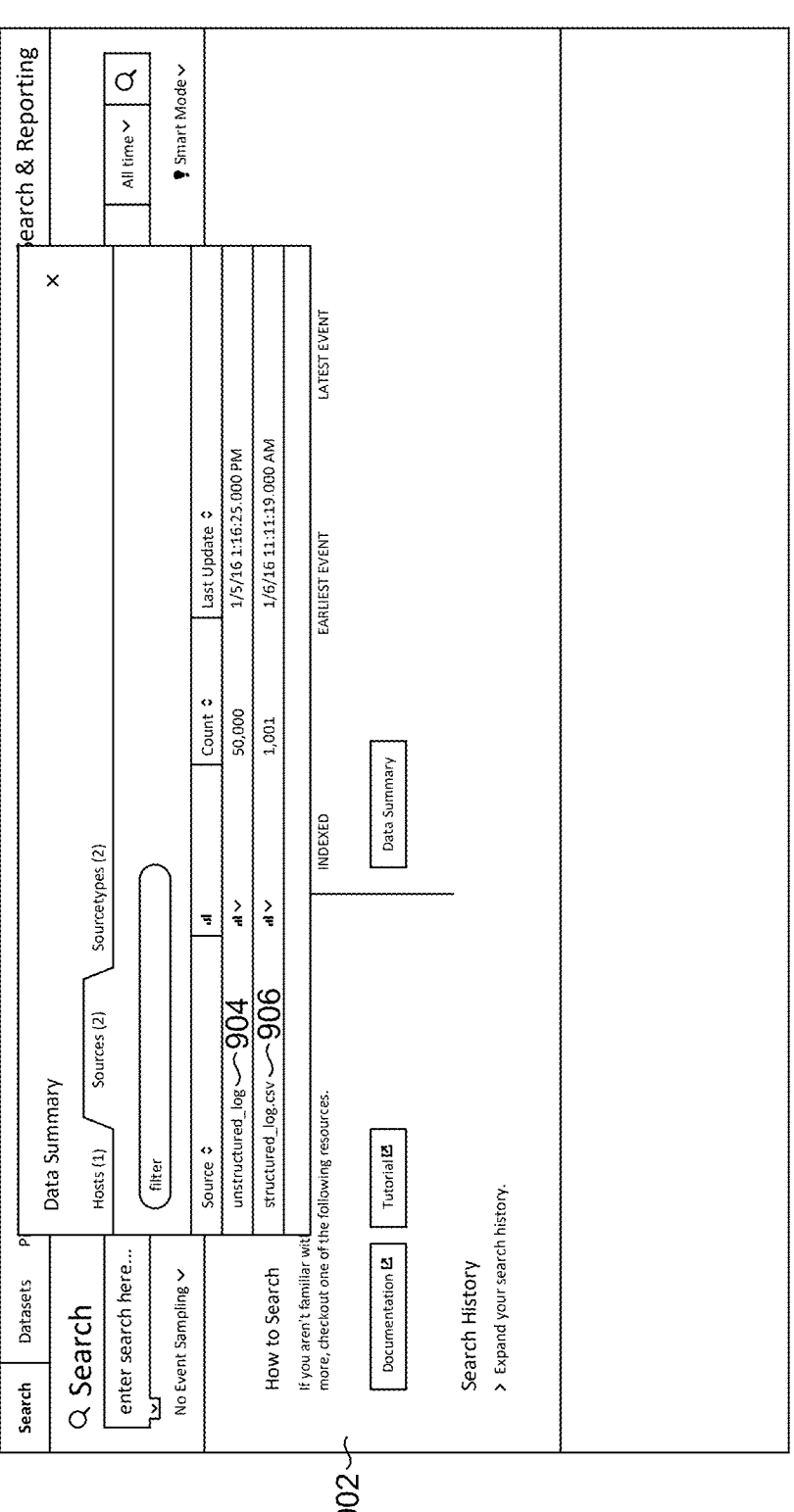
FIG. 9 illustrates a data source selection user interface, in accordance with embodiments of the present disclosure.
Figure 10:
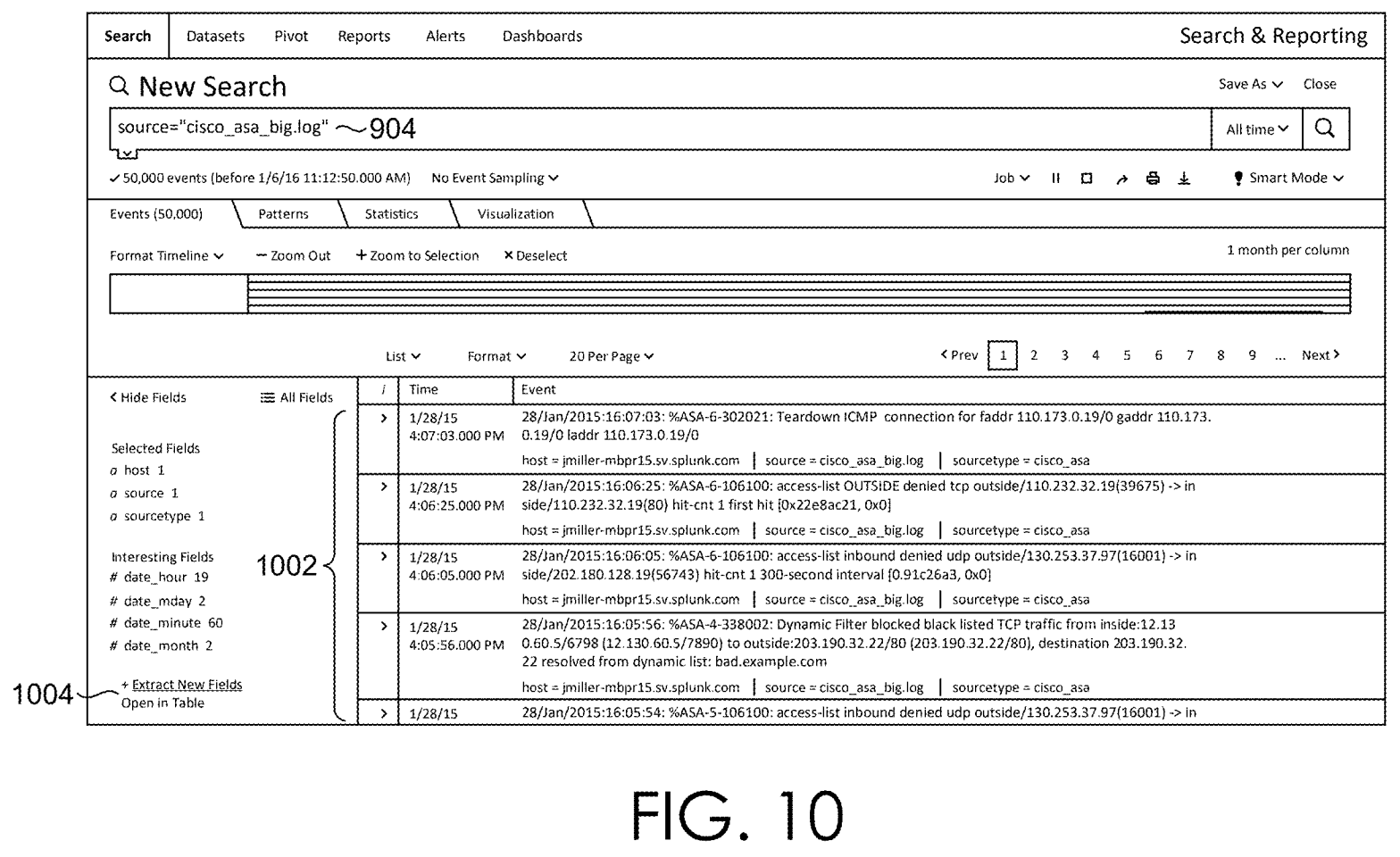

With initial reference to FIG. 9, a user interface 902 can be presented to a user in which a user can select a source of data 904 or 906 to utilize for extracting field values. Assume the user selects source of data 904. In such a case, events 1002 associated with the selected data source 904 are presented, as illustrated in FIG. 10. Assume that the user desires to extract field values. As such, the user selects to extract new fields 1004. In some cases, a value might be selected in an event listing with an option to "extract value." If selected, the user can be directed to the field extractor, or, in some cases, result in performance of field extraction (e.g., if a determination is made that extraction can be performed with high confidence without additional user interaction).

Figure 11:
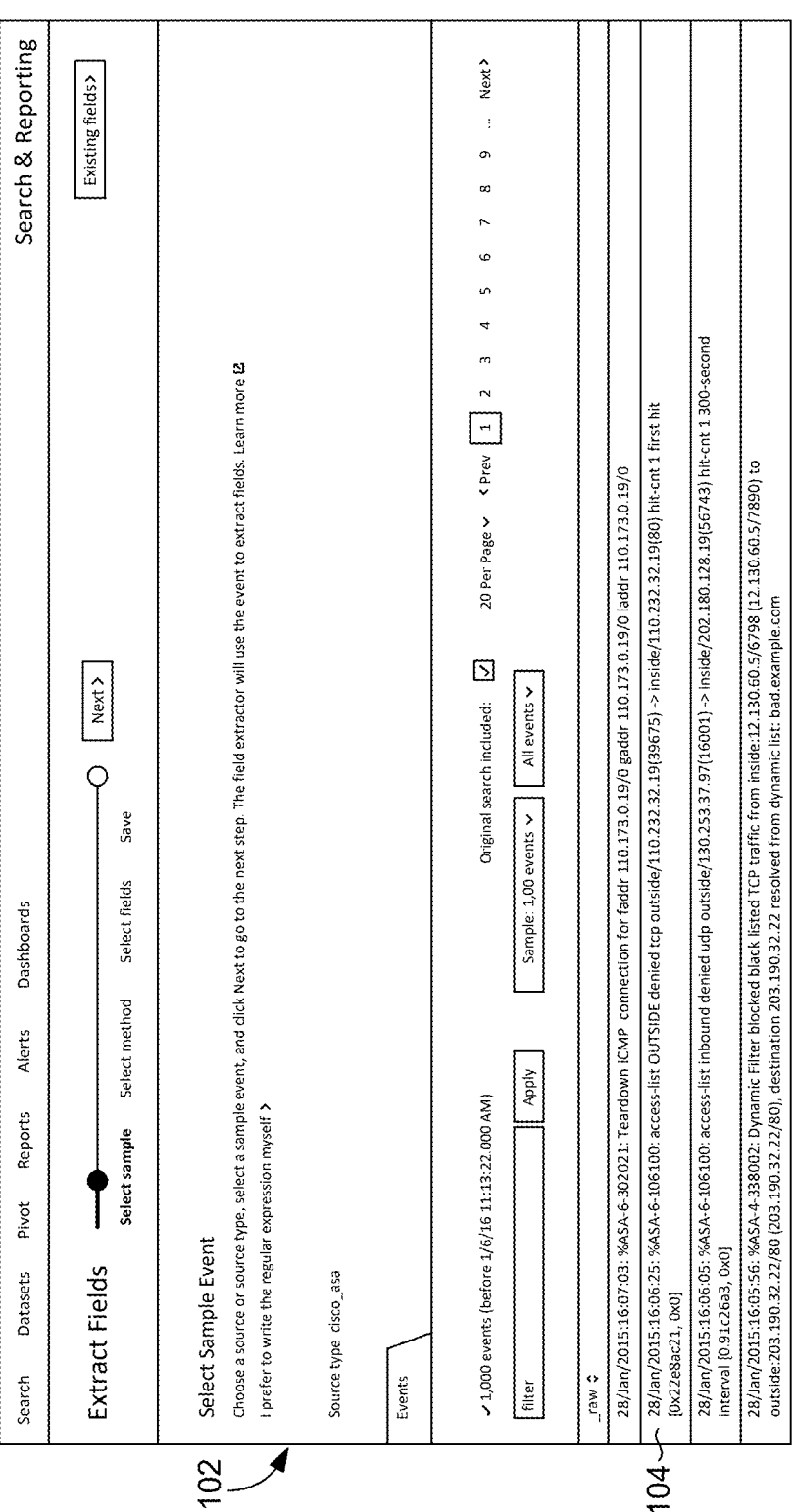
FIG. 11 illustrates a user interface for selecting a sample event, in accordance with embodiments of the present disclosure.
Figure 12:
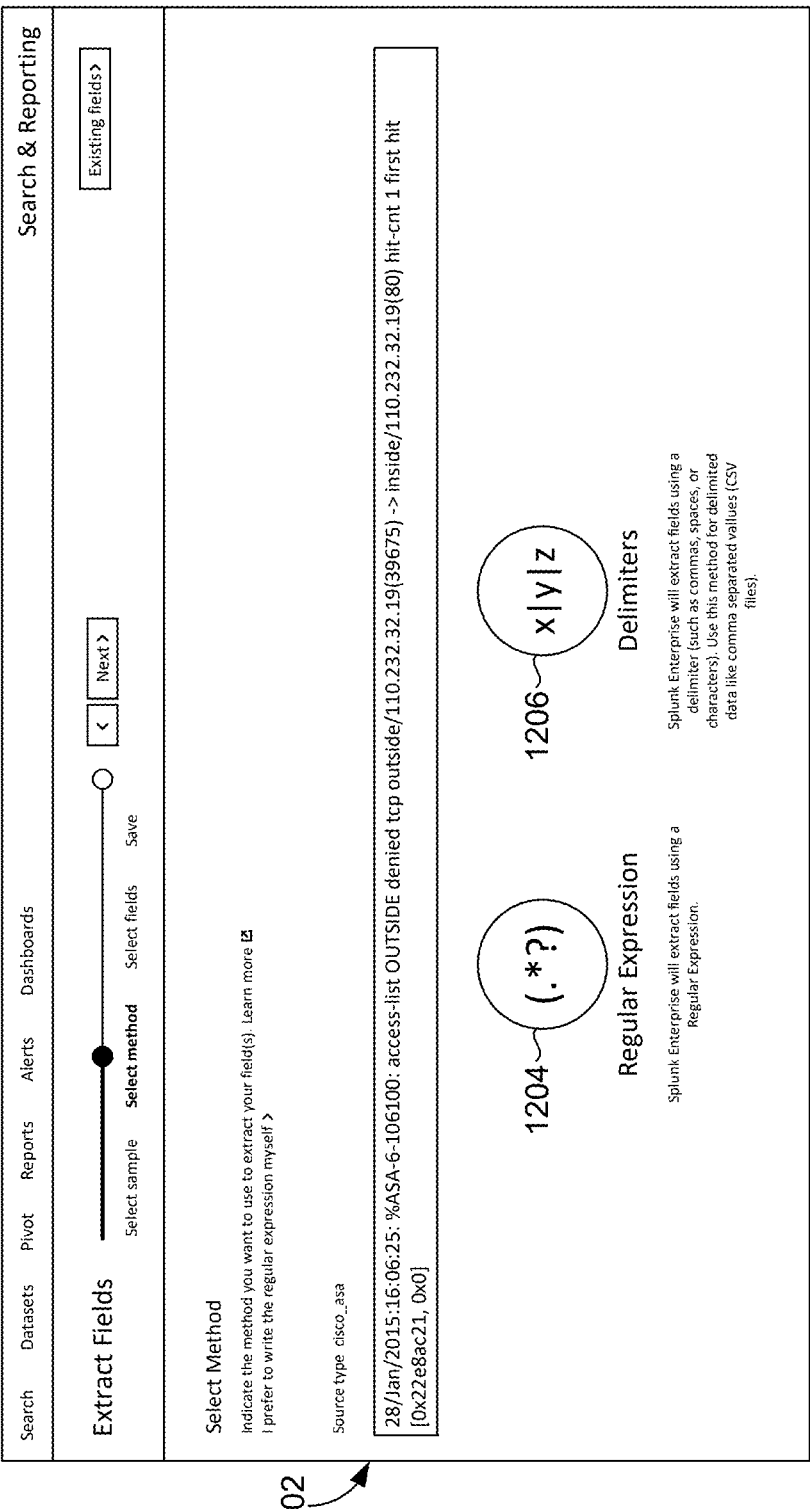
FIG. 12 illustrates a user interface for selecting an extraction mode, in accordance with embodiments of the present disclosure.

In accordance with a selection to perform field extraction (e.g., selection of extract new fields 1004 of FIG. 10), a user interface 1102 of FIG. 11 is presented. Initially, the user interface 1102 allows a user select a sample event. Here, assume the user selects event 1104 as the sample event. Upon selecting a sample event, a user interface 1202 of FIG. 12 is presented to allow the user to select whether to utilize a regular expression mode 1204 or a delimiter mode 1206 to extract field values in association with events. Initially, assume that the user selects to use a regular expression mode to extract field values by selecting regular expression mode 1204.

Figure 13:
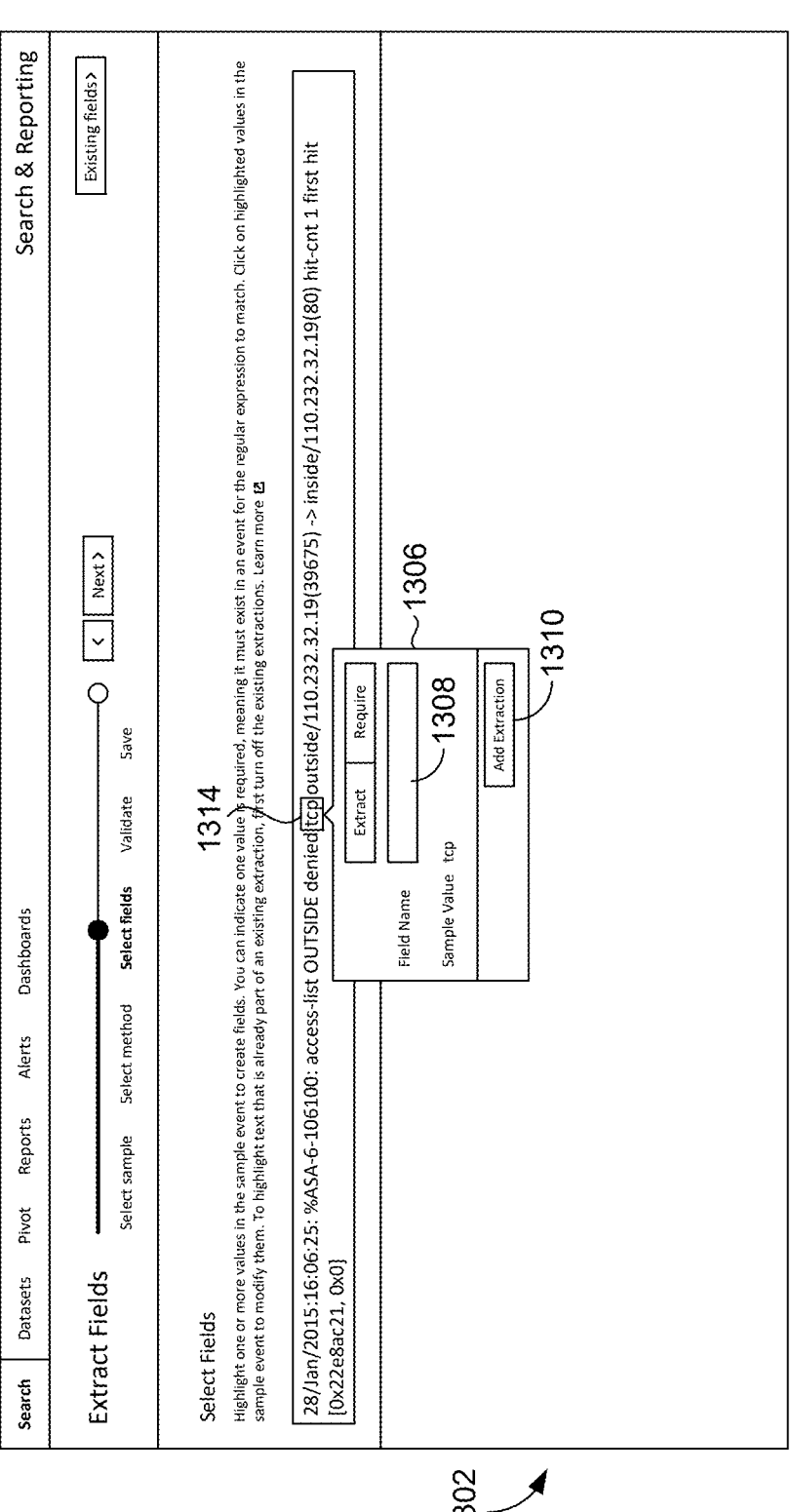
FIG. 13 illustrates a user interface for extracting values, in accordance with embodiments of the present disclosure.
Figure 16:
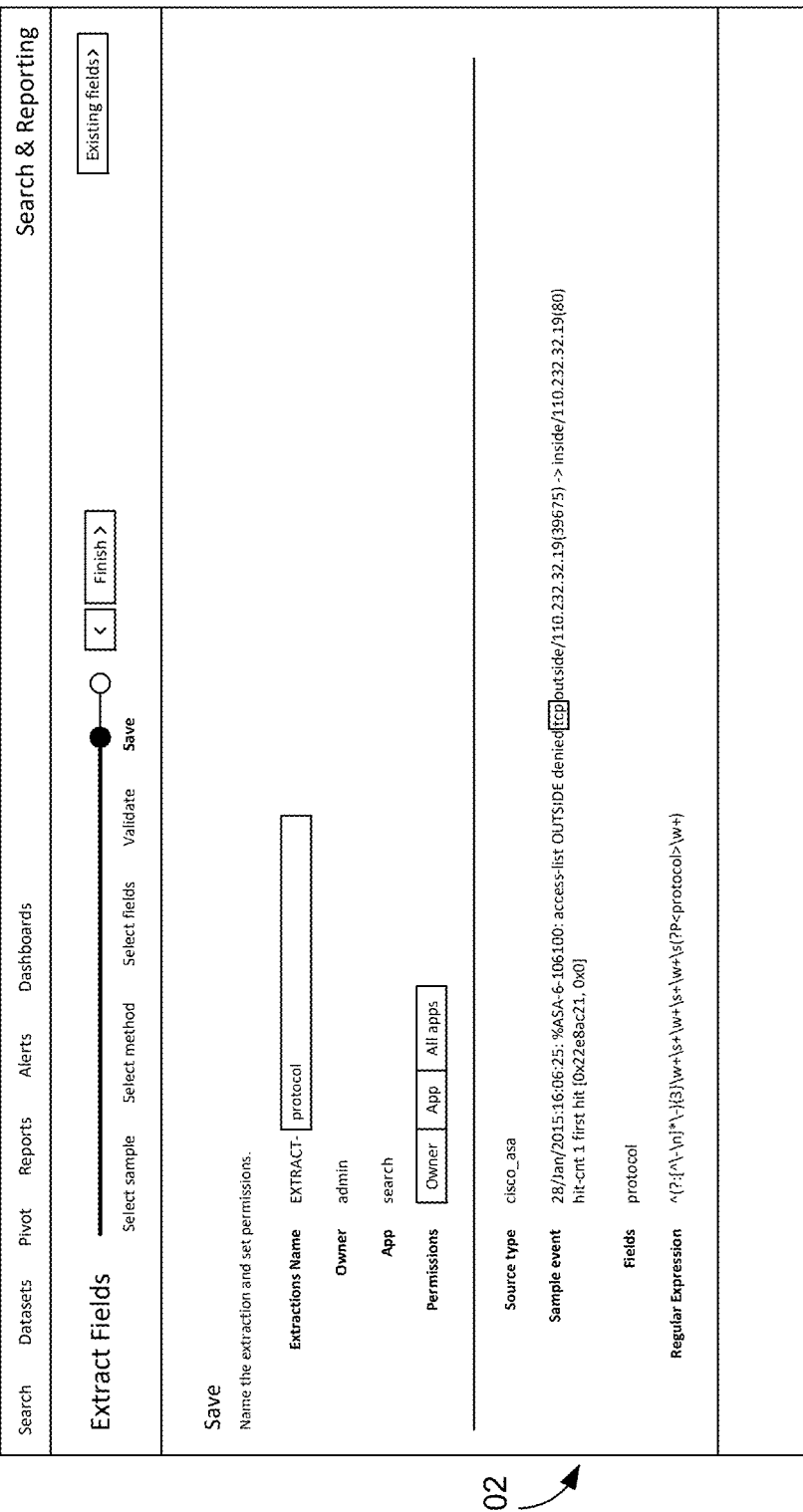
FIG. 16 illustrates a user interface for saving field extractions, in accordance with embodiments of the present disclosure.

In accordance with selecting regular expression mode 1204 of FIG. 12, a user interface 1302 is presented to enable a user to select fields from which field values are desired to be extracted. As shown in FIG. 13, to select a field, a user can place a selector over a field value to indicate a desired field to extract. For example, in FIG. 13, the user selects field value 1304 of "tcp" to indicate a field from which field values are desired to be extracted. In this case, a text box 1306 is presented to allow the user to provide a field name 1308 associated with the selected field. Although only one field is shown here as being selected, as can be appreciated, any number of fields can be selected. The user can then select to generate a field value extraction, for example, by selecting add extraction 1310. As illustrated in FIG. 14, the extracted or identified field values associated with the selected field are highlighted 1402, 1404, 1406, 1408, 1410, and 1412 in each of the events having the field "protocol."

In the event the user recognizes value not intended or desired to be extracted, the user can select to remove those values as values to extract from fields. For example, with reference to FIG. 15, the user can select the remove icon 1502 to remove "for" as a field value to extract in association with the "protocol" field. When the user is satisfied with the extraction being performed, the user can save the extraction, as shown in user interface 1602 in FIG. 16.

Figure 17:
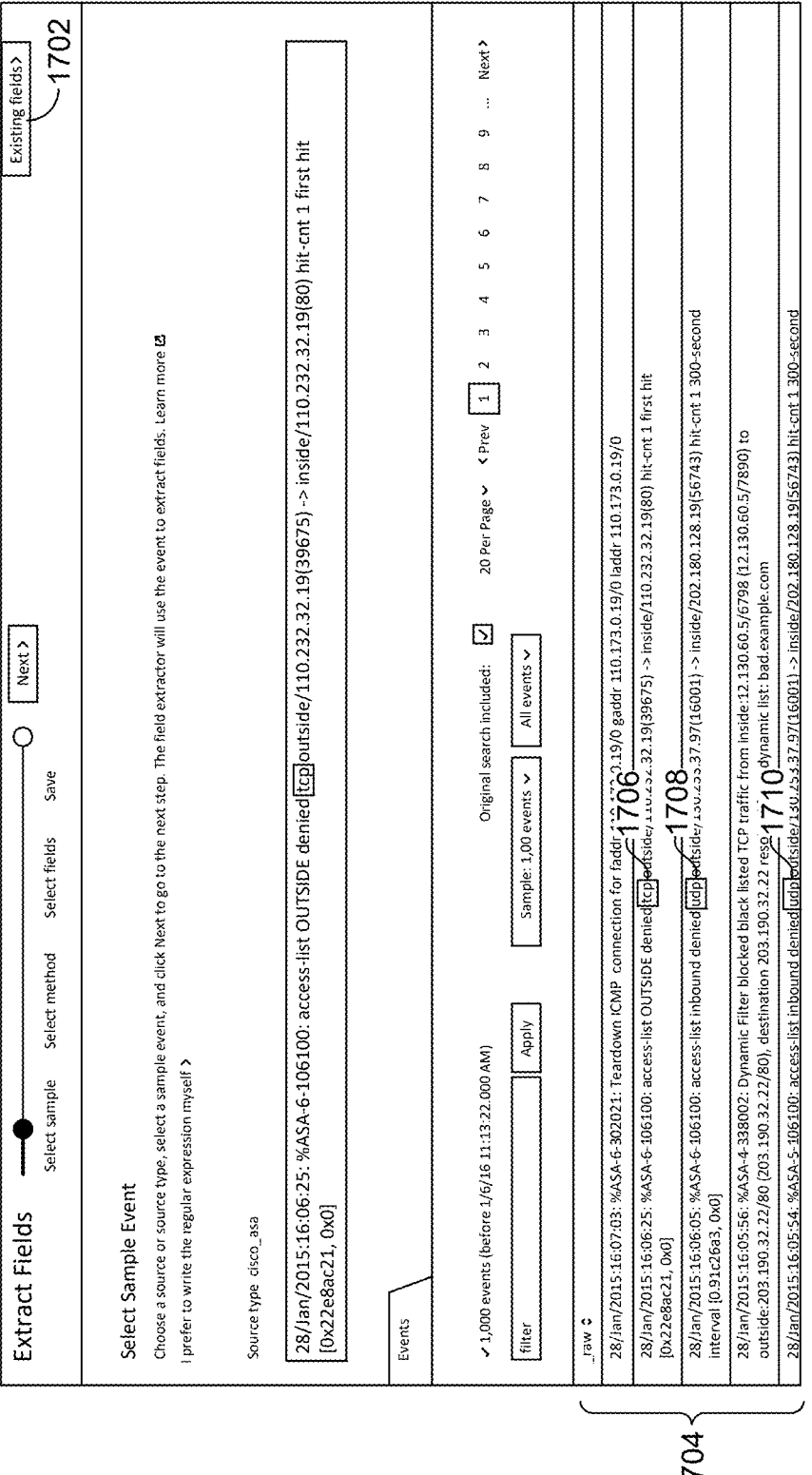
FIG. 17 illustrates a user interface for presenting existing field value extractions, in accordance with embodiments of the present disclosure.

As described herein, a user can select to view and/or modify existing extractions after such extractions have been generated. For example, upon selecting existing fields 1702 of FIG. 17, the events 1704 associated with a selected set of field extractions can be displayed. As shown in FIG. 17, the field values previously extracted can be highlighted, as shown at 1706, 1708, and 1710, to show the user which values have been previously extracted in association with the "protocol" field. As previously described, in some cases, the indication of previously extracted values may be formatted in a different manner than values currently being designated for extraction. For example, and with reference to FIG. 17, the extracted values may be designated with an outline.

Figure 18:
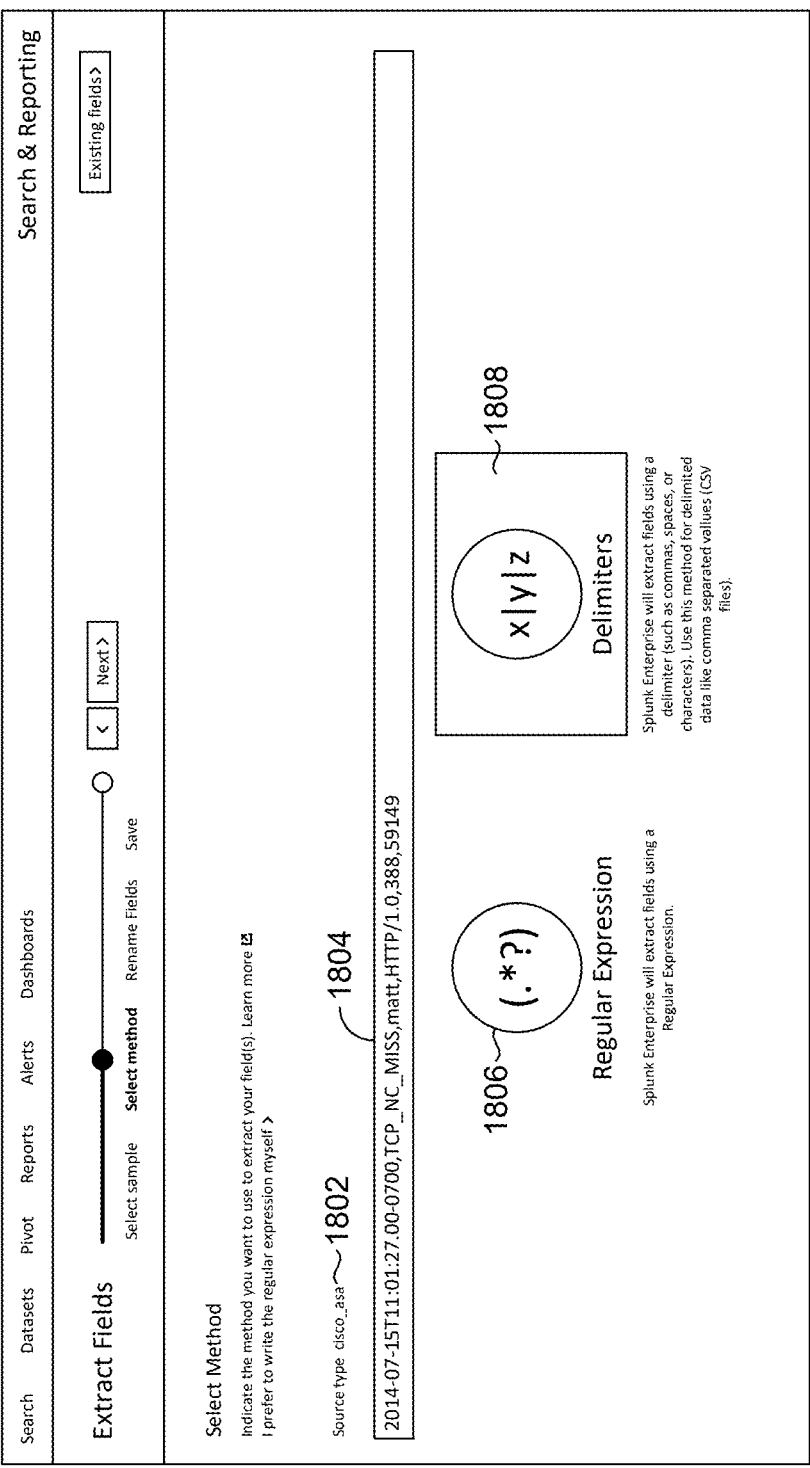
FIG. 18 illustrates a user interface for selecting an extraction mode, in accordance with embodiments of the present disclosure.

Assume now that a user desires to extract field values from a structured data source and, as such, has selected a source type 1802, as illustrated in FIG. 18. Further, as illustrated in FIG. 18, assume that the user has selected a sample event 1804. Now, as opposed to selecting a regular expression mode 1806, the user selects delimiter mode 1808 for extracting field values. For instance, the user may have viewed the sample event and/or other events, to recognize a consistent data structure, or use of delimiters, in an event or across events. Although not shown, in some embodiments, the user interface might also include a recommendation provided via the display that suggests or recommends a selection of a regular expression mode or a delimiter mode for use in extracting field values. For instance, in this case, in accordance with an automated analysis of the sample event or a set of events, a consistent use of a type of delimiter and/or number of delimiters might be identified and, in such a case, utilization of delimiter mode might be recommended.

Figure 19:
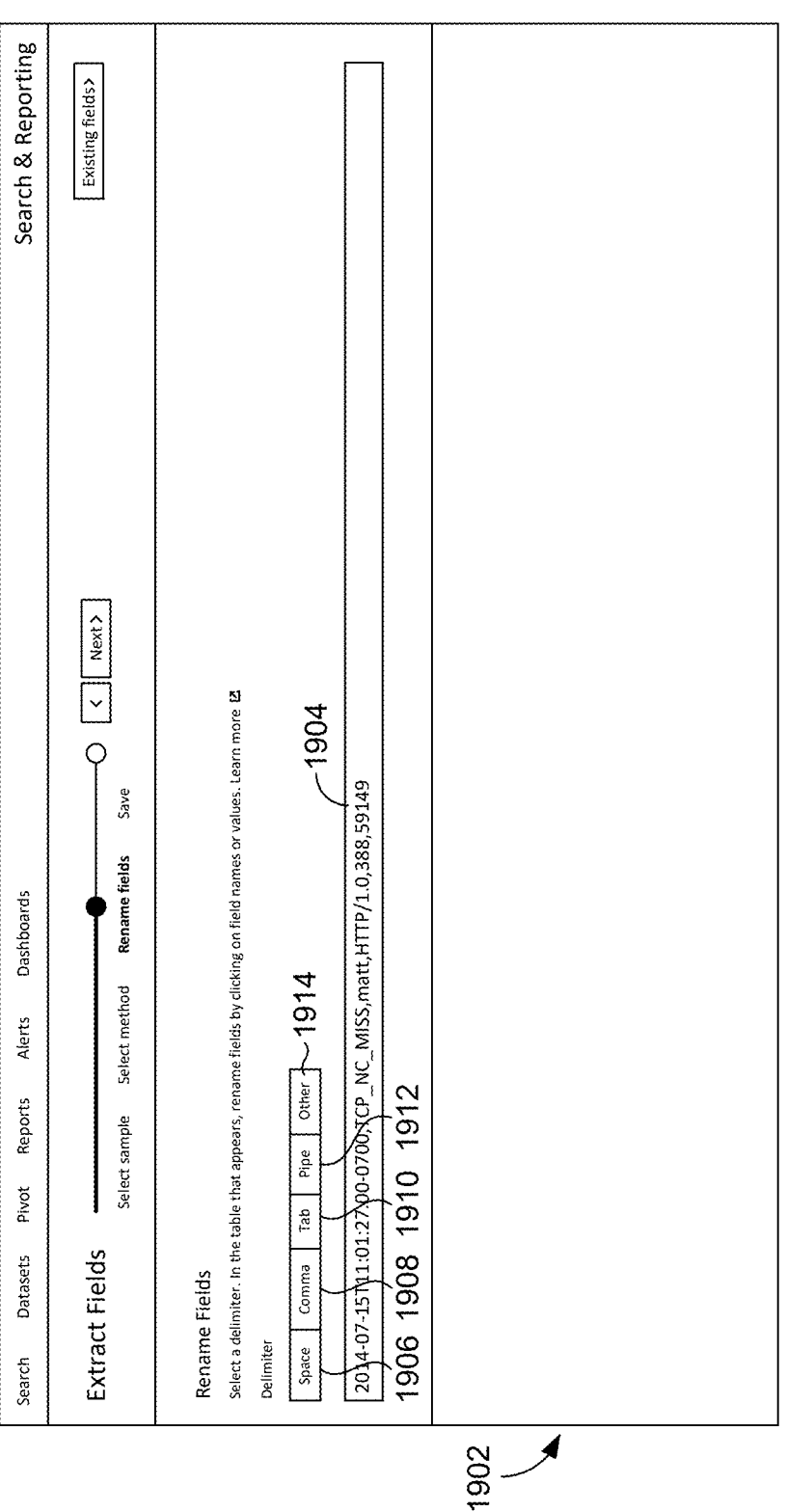
FIG. 19 illustrates a user interface for selecting a delimiter type, in accordance with embodiments of the present disclosure.

In accordance with selecting utilization of the delimiter mode 1808, the user interface 1902 can be presented to allow the user to select a particular type of delimiter to use for field value extraction. As shown in FIG. 19, several delimiter types are presented including a space delimiter 1906, a comma delimiter 1908, a tab delimiter 1910, a pipe delimiter 1912, or other delimiter 1914. The other delimiter

1910 may enable a user to select from additional delimiter types or to input a specific delimiter desired. Assume here that, upon reviewing the sample event 1904, the user elects to use the comma delimiter 1908.

Figure 20:
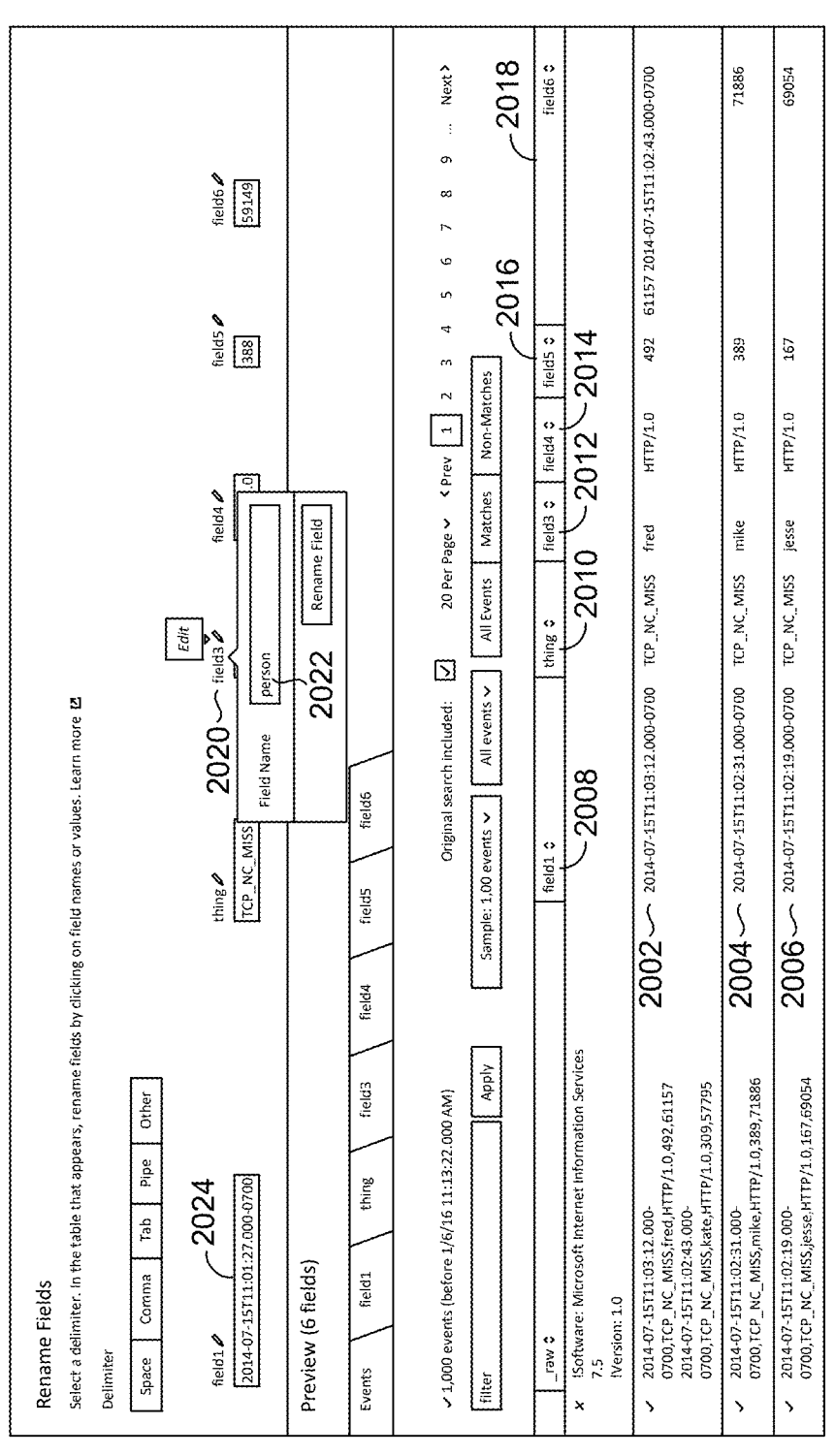
FIG. 20 illustrates a user interface for modifying field names, in accordance with embodiments of the present disclosure.

Upon selecting a delimiter mode, the user can be provided with an option of which type of delimiter to utilize to extract data. For example, as illustrated in FIG. 19, the user interface can present space delimiter 1906, comma delimiter 1908, tab delimiter 1910, pipe delimiter 1912, and other delimiter 1920. By viewing the sample event, assume the user selects to utilize the comma delimiter 1908. In accordance with selecting the comma delimiter 1908, as shown in FIG. 20, fields within events are identified based on the comma delimiter and the field values are extracted into corresponding fields. For example, as illustrated in FIG. 20, the field values 2002, 2004, and 2006 that occur prior to the first comma are extracted from the corresponding event and assigned or associated with "field 1" 2008. As shown in FIG. 20, fields 2010, 2012, 2014, 2016, and 2018 are also identified using the comma delimiter and corresponding field values are extracted from each of the events accordingly. Upon extracting the field values and assigning or associating the field values with corresponding fields, default field names can be modified by the user to specify a new field name (e.g., that describes the field). For example, as illustrated, a user can select an existing field name (e.g., a default field name) 2020 and input a new field name 2022 to rename the field.

Although not illustrated, a user might select a field value, such as field value 2024 in the sample event, to initiate a nested extraction. In such a case, upon selecting the field value 2024, an option to include a delimiter extraction or regular expression extraction within that selected field might be provided (e.g., via a pop-up text box).

Figure 21:
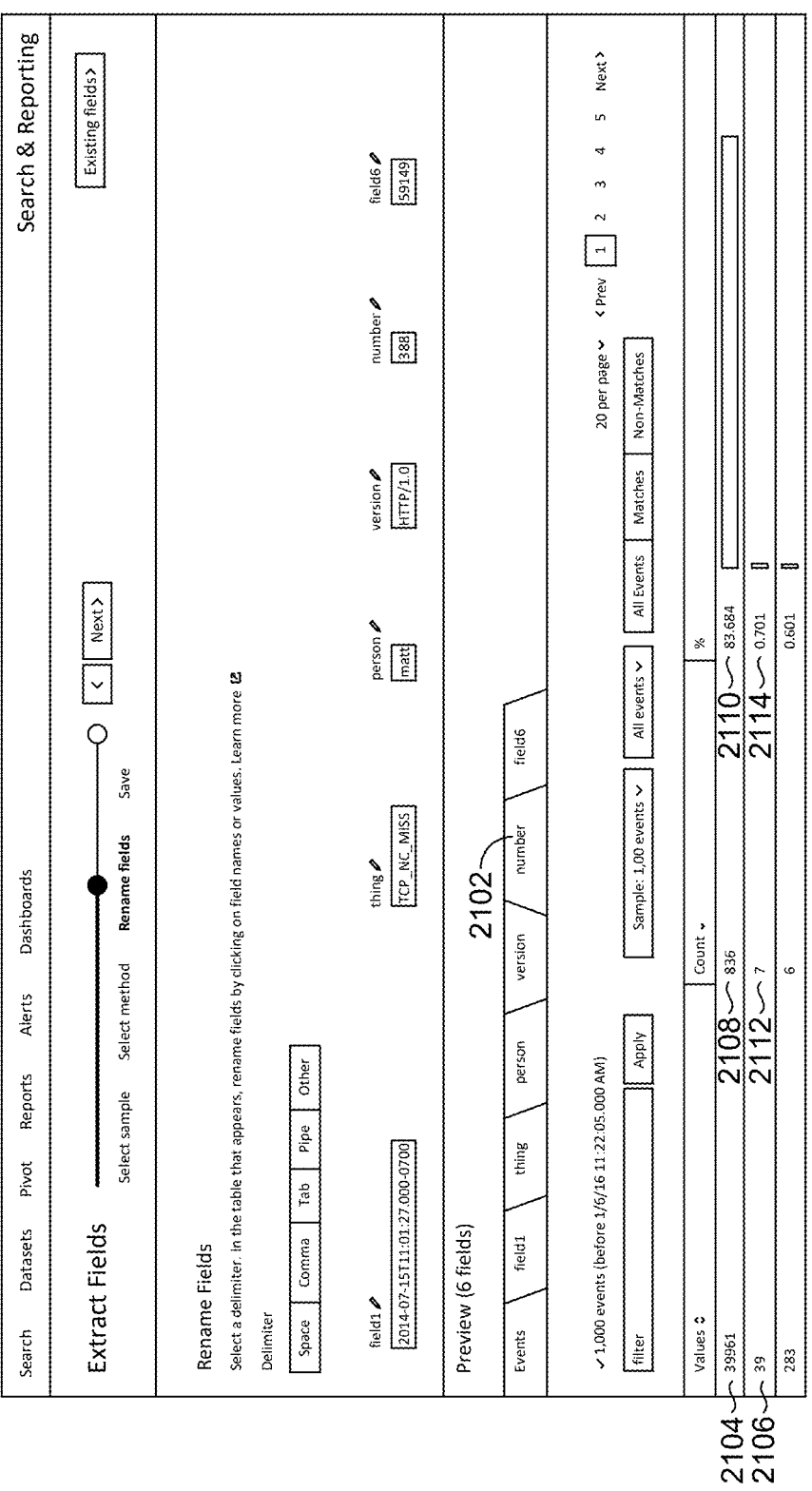
FIG. 21 illustrates a user interface for viewing data associated with fields, in accordance with embodiments of the present disclosure.

In addition to viewing the extracted field values in connection with the event, as shown in FIG. 20, a user might also select to view data associated with a particular field by selecting a field tab. That is, a user may wish to view what is being extracted to the field across events. For example, with reference to FIG. 21, the user might select to view data associated with field 2102 named or labeled as a "number" field. In such a case, each value extracted from the "number" field in association with the events can be presented along with corresponding information, such as the count or number of occurrences of each value, a percent of occurrences of each value, or the like. For example, as shown in FIG. 21, the value 2104 as "39961" was extracted from 836 events 2108, which is approximately 84% of the events 2110. As another example, the value 2106 of "39" was extracted from 7 events 2112, which is approximately 0.7% of the events 2114. Upon confirming the appropriate or desired field values are extracted from fields within events, the extraction can be saved, as illustrated in FIG. 22.

Figure 23:
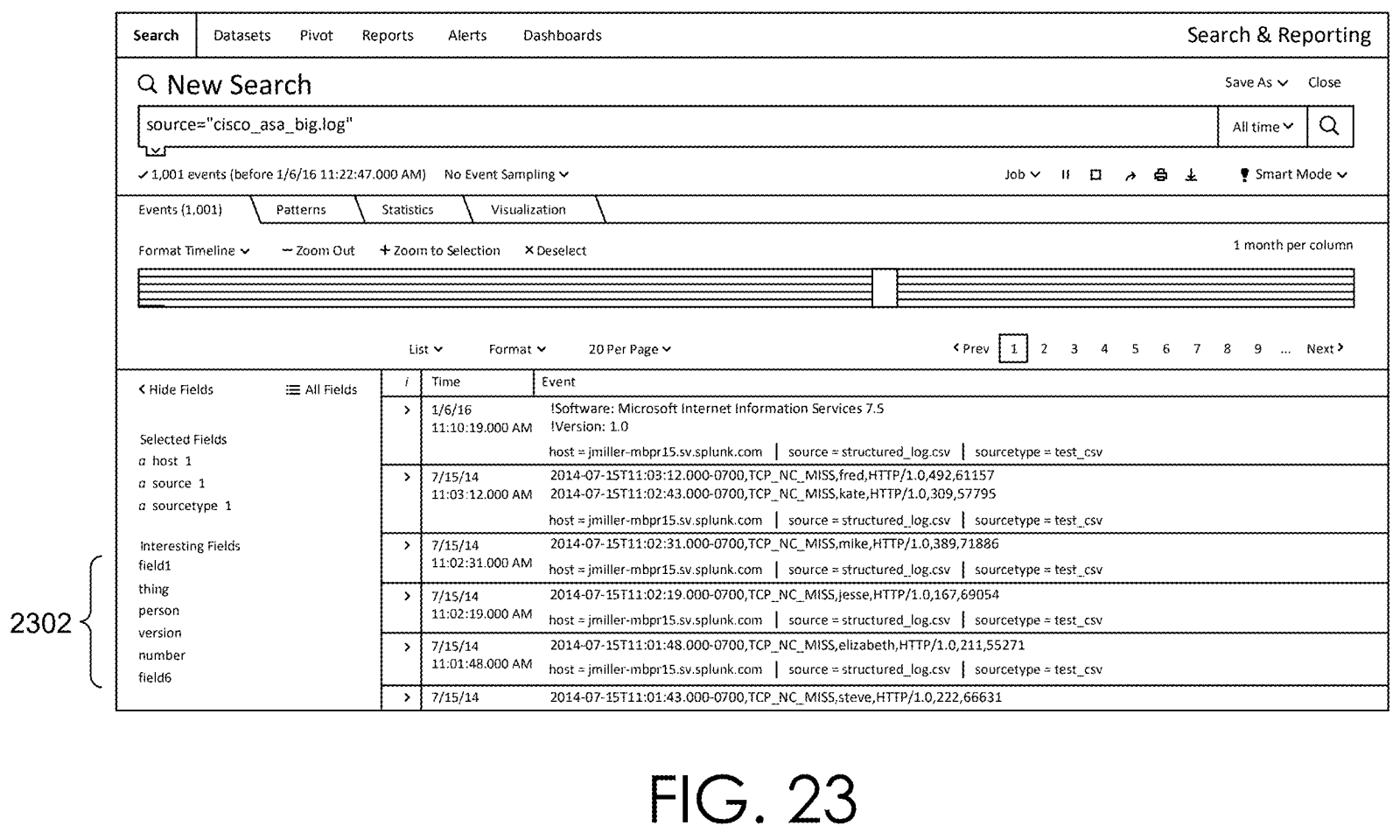

Now, with reference to FIG. 23, assume a user desires to search data or view reports on data. In such a case, the user can view the newly extracted fields as field options 2302 for use in searching, viewing, or creating reports associated with the fields.

2.3 Illustrative Field Extraction Operations

FIGS. 24-26 illustrate various methods of processing field extractions in accordance with embodiments of the present invention. Although the method 2400 of FIG. 24, the method 2500 of FIG. 25, and the method 2600 of FIG. 26 are provided as separate methods, the methods, or aspects thereof, can be combined into a single method or combination of methods. As can be appreciated, additional or alternative steps may also be included in different embodiments.

FIG. 24 is a flow diagram depicting an illustrative method of processing field extractions in accordance with a delimiter mode. Initially, as indicated at block 2402, a user selection of a delimiter type to use for identifying field values within events is received. A delimiter type may be, for example, a comma, a tab, a pipe, an asterisk, or the like. Using the selected delimiter, a first set of one or more field values are identified from a plurality of events, as indicated at block 2404. In this regard, a first instance of a selected delimiter can be used to identify the first set of field values to identify. At block 2406, the first set of one or more values are assigned to a first field. Using the selected delimiter, a second set of one or more values are identified from the plurality of events, as indicated at block 2408. In this regard, a second instance of a selected delimiter can be used to identify the second set of field value to identify. At block 2410, the second set of one or more values are assigned to a second field.

Turning now to FIG. 25, FIG. 25 is a flow diagram depicting another illustrative method of processing field extractions in accordance with a delimiter mode. Initially, at block 2502, source data having a plurality of events is selected. At block 2504, a sample event is selected from the plurality of events within the source data. As indicated at block 2506, selection to utilize a delimiter mode is received. For example, a user might view the sample event and elect to use a delimiter mode to extract field values from events. The delimiter mode might be selected from among other modes of field extraction, such as a regular expression extraction mode. In some cases, the delimiter mode might be provided as a recommendation to the user, for example, based on recognition of a consistent type of delimiter and/or a consistent number of delimiters across events. Upon selecting the delimiter mode, as shown at block 2508, a selection of a specific type of delimiter to use for extracting field values from events is received. Fields within the plurality of events are defined based on the selected delimiter type, as indicated at block 2510. Based on a first instance of the delimiter type within each of the plurality of events, a first set of field values are extracted. This is shown in at block 2512. At block 2514, based on a second instance of the delimiter type within each of the plurality of events, a second set of field values are extracted. The first set of field values are associated with a first field, and the second set of field values are associated with a second field, as indicated at block 2516. At block 2518, the first set of field values and corresponding first field and the second set of field values and corresponding second field are provided for presentation to the user.

With reference to FIG. 26, FIG. 26 is a flow diagram depicting an illustrative method of processing nested field extractions in accordance with embodiments described herein. Initially, at block 2602, selection to utilize a first extraction rule is received. For example, a user might view a sample event and elect to use a delimiter rule to extract field values from events. At block 2604, the first extraction rule is applied to identify a set of field values associated with a field within a plurality of events. At block 2606, selection of one of the identified field values or the field is received. In accordance with the selected field value or field, an indication to utilize a second extraction rule in association with the field value or field is received. This is indicated at block 2608. As can be appreciated, the first extraction rule and the second extraction rule can be any combination of a regular expression rule and a delimiter rule. At block 2610, the second extraction rule is applied to identify a set of substrings within the set of field values.

Upon selecting the first extraction mode, as shown at block 2604, a selection of a specific type of delimiter to use for extracting field values from events is received. Fields within the plurality of events are defined based on the selected delimiter type, as indicated at block 2510. Based on a first instance of the delimiter type within each of the plurality of events, a first set of field values are extracted. This is shown in at block 2512. At block 2514, based on a second instance of the delimiter type within each of the plurality of events, a second set of field values are extracted. The first set of field values are associated with a first field, and the second set of field values are associated with a second field, as indicated at block 2516. At block 2518, the first set of field values and corresponding first field and the second set of field values and corresponding second field are provided for presentation to the user.

3.1 Illustrative Hardware System

The systems and methods described above may be implemented in a number of ways. One such implementation includes computer devices having various electronic components. For example, components of the system in FIG. 8 may, individually or collectively, be implemented with devices having one or more Application Specific Integrated Circuits (ASICs) adapted to perform some or all of the applicable functions in hardware. Alternatively, the functions may be performed by one or more other processing units (or cores), on one or more integrated circuits or processors in programmed computers. In other embodiments, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific computer processors.

Figure 27:
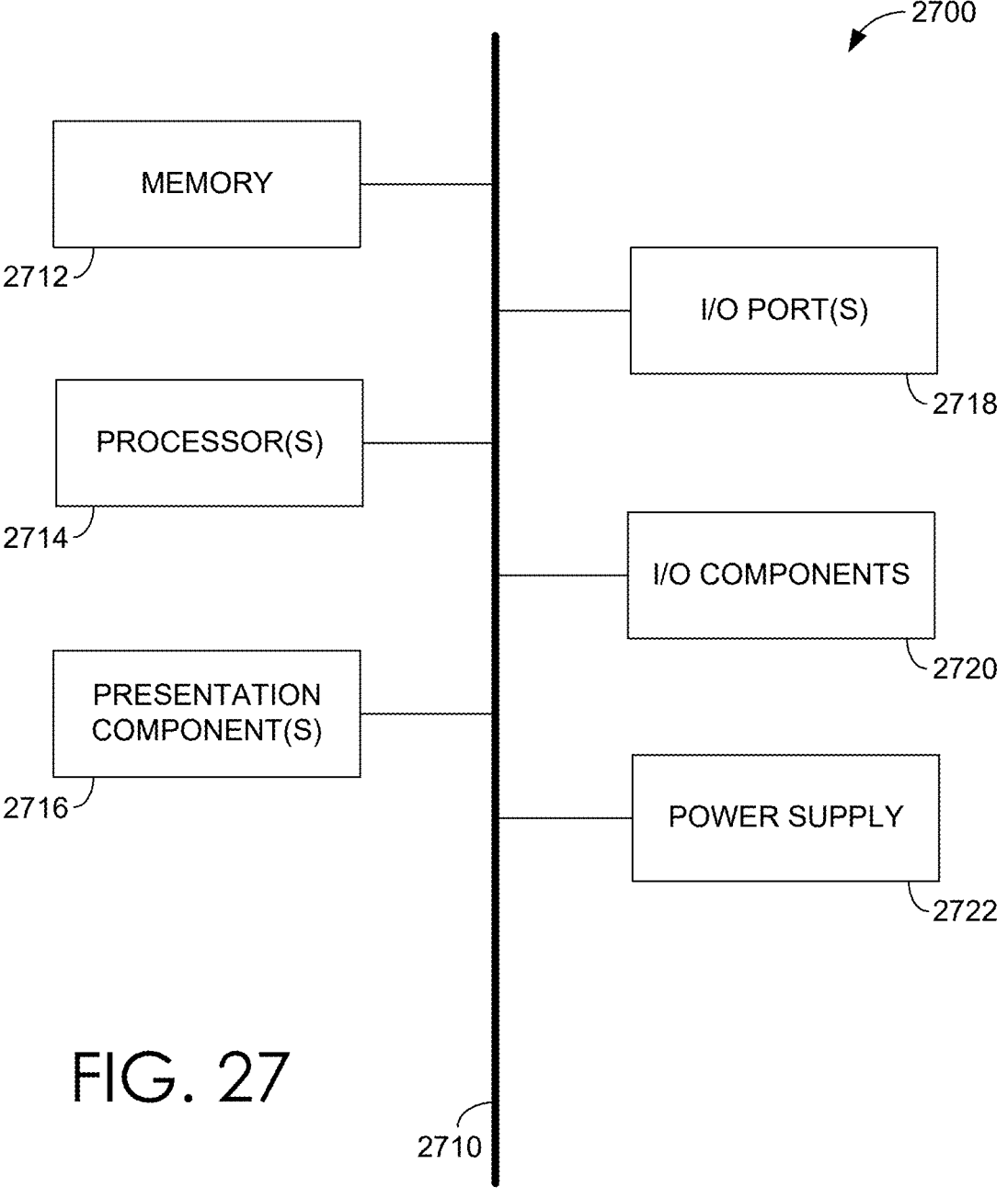
FIG. 27 is a block diagram of an example computing device in which embodiments of the present disclosure may be employed.

An example operating environment in which embodiments of the present invention may be implemented is described below in order to provide a general context for various aspects of the present invention. Referring to FIG. 27, an illustrative operating environment for implementing embodiments of the present invention is shown and designated generally as computing device 2700. Computing device 2700 is but one example of a suitable operating environment and is not intended to suggest any limitation as to the scope of use or functionality of the invention. Neither should the computing device 2700 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The invention may be practiced in a variety of system configurations, including handheld devices, consumer electronics, general-purpose computers, more specialized computing devices, etc. The invention may also be practiced in distributed computing environments where tasks are performed by remote-processing devices that are linked through a communications network.

With reference to FIG. 27, computing device 2700 includes a bus 2710 that directly or indirectly couples the following devices: memory 2712, one or more processors 2714, one or more presentation components 2716, input/output (I/O) ports 2718, I/O components 2720, and an illustrative power supply 2722. Bus 2710 represents what may be one or more busses (such as, for example, an address bus, data bus, or combination thereof). Although depicted in FIG. 27, for the sake of clarity, as delineated boxes that depict groups of devices without overlap between these groups of devices, in reality, this delineation is not so clear cut and a device may well fall within multiple ones of these depicted boxes. For example, one may consider a display to be one of the one or more presentation components 2716 while also being one of the I/O components 2720. As another example, processors have memory integrated therewith in the form of cache; however, there is no overlap depicted between the one or more processors 2714 and the memory 2712. A person of skill in the art will readily recognize that such is the nature of the art, and it is reiterated that the diagram of FIG. 27 merely depicts an illustrative computing device that can be used in connection with one or more embodiments of the present invention. It should also be noticed that distinction is not made between such categories as "workstation," "server," "laptop," "handheld device," etc., as all such devices are contemplated to be within the scope of computing device 2700 of FIG. 27 and any other reference to "computing device," unless the context clearly indicates otherwise.

Computing device 2700 typically includes a variety of computer-readable media. Computer-readable media can be any available media that can be accessed by computing device 2700 and includes both volatile and nonvolatile media, and removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 2700. Computer storage media does not comprise signals per se, such as, for example, a carrier wave. Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer-readable media.

Memory 2712 includes computer storage media in the form of volatile and/or nonvolatile memory. The memory may be removable, non-removable, or a combination thereof. Typical hardware devices may include, for example, solid-state memory, hard drives, optical-disc drives, etc. Computing device 2700 includes one or more processors 2714 that read data from various entities such as memory 2712 or I/O components 2720. Presentation component(s) 2716 present data indications to a user or other device. Illustrative presentation components include a display device, speaker, printing component, vibrating component, etc.

I/O ports 2718 allow computing device 2700 to be logically coupled to other devices including I/O components 2720, some of which may be built in. Illustrative components include a keyboard, mouse, microphone, joystick, game pad, satellite dish, scanner, printer, wireless device, etc. The I/O components 2720 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described elsewhere herein) associated with a display of the computing device 2700. The computing device 2700 may be equipped with depth cameras, such as stereoscopic camera systems, infrared camera systems, RGB camera systems, touchscreen technology, and combinations of these, for gesture detection and recognition. Additionally, the computing device 2700 may be equipped with accelerometers or gyroscopes that enable detection of motion.

As can be understood, implementations of the present disclosure provide for various approaches to data processing. The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and subcombinations are of utility and may be employed without reference to other features and subcombinations. This is contemplated by and is within the scope of the claims.

The invention claimed is:

1. A computer-implemented method comprising:
causing display, via a graphical user interface, of an indication of a delimiter mode that is used to identify values within fields that are separated from one another by delimiters;
causing display, via the graphical user interface and based on the delimiter mode, of a plurality of delimiter types to use for identifying the values within the fields separated by the delimiters;
causing display, via the graphical user interface, of:
a first field and a corresponding first set of one or more values from a plurality of events, wherein the first field is identified based on a delimiter type selected from the plurality of delimiter types and the first set of one or more values is extracted, via a processor, from the plurality of events based on the delimiter type selected, and
a second field and a corresponding second set of one or more values from the plurality of events, wherein the second field is identified based on the delimiter type selected from the plurality of delimiter types and the second set of one or more values is extracted, via the processor, from the plurality of events based on the delimiter type selected.

2. The computer-implemented method of claim 1, wherein the delimiter type selected from the plurality of delimiter types comprises one of a carriage return, a tab, a space, a comma, a semi-colon, a colon, an ampersand, an apostrophe, an asterisk, a back slash, a brace, a bracket, a carat, a parenthesis, a percent, a pound, an underscore, or a forward slash.

3. The computer-implemented method of claim 1, wherein the first set of the one or more values are extracted from the plurality of events by:
identifying a first delimiter of the delimiter type selected from the plurality of delimiter types in each event of the plurality of events; and
identifying the first set of the one or more values from the plurality of events that correspond with the identified first delimiter.

4. The computer-implemented method of claim 1 further comprising:
receiving an indication of a data source;
receiving a selection of a sample event from the plurality of events associated with the data source;
causing display, via the graphical user interface, of the sample event in association with an option to select the delimiter mode and an option to select a regular expression mode; and
receiving a user selection of the delimiter mode.

5. The computer-implemented method of claim 1 further comprising receiving a first field name for the first field and a second field name for the second field.

6. The computer-implemented method of claim 1 further comprising:
causing display, via the graphical user interface, of an option to select the delimiter mode and an option to select a regular expression mode; and
providing a recommendation indicating a preferred mode to use based on the plurality of events.

7. The computer-implemented method of claim 1 further comprising causing the graphical user interface to present a sample event of the plurality of events while receiving a first input identifying the delimiter mode.

8. The computer-implemented method of claim 1 further comprising:
providing an option to select the delimiter mode and an option to select a regular expression mode; and
providing a recommendation indicating a preferred mode to use based on the plurality of events, wherein the delimiter mode is provided as the recommendation when the plurality of events include a consistent number of delimiters and a same type of delimiters and the regular expression mode is provided as the recommendation when the plurality of events do not include the consistent number of delimiters or the same type of delimiters.

9. The computer-implemented method of claim 1 further comprising providing a recommendation of the delimiter type to use for identifying the values within the fields, wherein the recommended delimiter type to use is selected based on a scan of the plurality of events.

10. The computer-implemented method of claim 1 further comprising:
receiving a regular expression rule to use for identifying the values within the fields; and identifying the first set of the one or more values from the plurality of events based on the delimiter type selected and the regular expression rule.

11. The computer-implemented method of claim 1, wherein the first set of the one or more values are presented with a value count that indicates a number of instances the value appears in the plurality of events.

12. The computer-implemented method of claim 1, wherein each value of the first set of the one or more values is presented in a row of the corresponding event.

13. The computer-implemented method of claim 1 further comprising:

after assigning the identified first set of the one or more values to the first field and the second set of the one or more values to the second field, receiving a user selection to use a regular expression rule to identify substring values within the first set of the one or more values of the first field;

receiving an indication of a sample substring value within one of the one or more values within the first set of the one or more values;

based on the indicated sample substring value, generating the regular expression rule to use to identify the substring values within the first set of the one or more values of the first field; and using the regular expression rule to identify the substring values within the first set of the one or more values of the first field.

14. The computer-implemented method of claim 1 further comprising:

after assigning the identified first set of the one or more values to the first field and the second set of the one or more values to the second field, receiving a user selection to use a new delimiter type to identify substring values within the first set of the one or more values of the first field;

receiving an indication of the new delimiter type; and using the new delimiter type to identify the substring values within the first set of the one or more values of the first field.

15. The computer-implemented method of claim 1, wherein the plurality of events comprise raw machine data.

16. One or more computer-storage media storing computer-useable instructions that, when executed by one or more processors, cause the one or more processors to perform operations comprising:

causing display, via a graphical user interface, of an indication of a delimiter mode that is used to identify values within fields that are separated from one another by delimiters;

causing display, via the graphical user interface and based on the delimiter mode, of a plurality of delimiter types to use for identifying the values within the fields separated by the delimiters;

causing display, via the graphical user interface, of:

a first field and a corresponding first set of one or more values from a plurality of events, wherein the first field is identified based on a delimiter type selected from the plurality of delimiter types and the first set of one or more values is extracted, via a processor, from the plurality of events based on the delimiter type selected, and a second field and a corresponding second set of one or more values from the plurality of events, wherein the second field is identified based on the delimiter type selected from the plurality of delimiter types and the second set of one or more values is extracted, via the processor, from the plurality of events based on the delimiter type selected.

17. The one or more computer-storage media of claim 16, wherein the first set of the one or more values are extracted from the plurality of events by:

identifying a first delimiter of the delimiter type selected from the plurality of delimiter types in each event of the plurality of events; and identifying the first set of the one or more values from the plurality of events that correspond with the identified first delimiter.

18. The one or more computer-storage media of claim 16, wherein the delimiter type selected from the plurality of delimiter types comprises one of a carriage return, a tab, a space, a comma, a semi-colon, a colon, an ampersand, an apostrophe, an asterisk, a back slash, a brace, a bracket, a carat, a parenthesis, a percent, a pound, an underscore, or a forward slash.

19. A system comprising:

one or more data processors; and one or more computer-storage media storing computer-useable instructions that, when executed by the one or more data processors, cause the one or more data processors to perform operations comprising:

causing display, via a graphical user interface, of an indication of a delimiter mode that is used to identify values within fields that are separated from one another by delimiters;

causing display, via the graphical user interface and based on the delimiter mode, of a plurality of delimiter types to use for identifying the values within the fields separated by the delimiters;

causing display, via the graphical user interface, of:

a first field and a corresponding first set of one or more values from a plurality of events, wherein the first field is identified based on a delimiter type selected from the plurality of delimiter types and the first set of one or more values is extracted, via a processor, from the plurality of events based on the delimiter type selected, and a second field and a corresponding second set of one or more values from the plurality of events, wherein the second field is identified based on the delimiter type selected from the plurality of delimiter types and the second set of one or more values is extracted, via the processor, from the plurality of events based on the delimiter type selected.

20. The system of claim 19, wherein the first set of one or more values are presented with a value count that indicates a number of instances the first set of one or more values appear in the plurality of events.

* * * * *